US008305313B2

(12) United States Patent
Furuya et al.

(10) Patent No.: US 8,305,313 B2
(45) Date of Patent: Nov. 6, 2012

(54) LIQUID CRYSTAL DISPLAY APPARATUS, AND DRIVING CIRCUIT AND DRIVING METHOD THEREOF

(75) Inventors: Masato Furuya, Kanagawa-ken (JP); Shuichi Konno, Tokyo-to (JP); Manabu Endou, Kanagawa-ken (JP); Yoshihiro Hori, Kanagawa-ken (JP); Takashi Kozakai, Kanagawa-ken (JP); Aiichiro Fujiyama, Kanagawa-ken (JP); Taku Katayama, Kanagawa-ken (JP); Hideo Kurogane, Kanagawa-ken (JP)

(73) Assignee: Victor Company of Japan, Ltd., Yokohama (JP)

( * ) Notice: Subject to any disclaimer, the term of this patent is extended or adjusted under 35 U.S.C. 154(b) by 914 days.

(21) Appl. No.: 12/379,161

(22) Filed: Feb. 13, 2009

(65) Prior Publication Data

US 2009/0219238 A1 Sep. 3, 2009

(30) Foreign Application Priority Data

Feb. 19, 2008 (JP) ................................ 2008-037180
Dec. 25, 2008 (JP) ................................ 2008-329050

(51) Int. Cl.
*G09G 3/36* (2006.01)
*G06F 3/038* (2006.01)

(52) U.S. Cl. ............... 345/87; 345/93; 345/90; 345/204

(58) Field of Classification Search .................... 345/67, 345/87, 90
See application file for complete search history.

(56) References Cited

U.S. PATENT DOCUMENTS 4,471,347 A 9/1984 Nakazawa
5,041,823 A * 8/1991 Johnson et al. ................ 345/94
6,278,426 B1 8/2001 Akiyama
6,331,844 B1 12/2001 Okumura et al.
6,456,267 B1 9/2002 Sato et al.
6,756,953 B1 * 6/2004 Tokioka et al. ................ 345/87
7,365,719 B2 * 4/2008 Miyagawa ...................... 345/82
7,928,937 B2 * 4/2011 Ozaki ............................ 345/82
2004/0263440 A1 * 12/2004 Kimura et al. ................. 345/76
2005/0259703 A1 * 11/2005 You et al. .................. 372/38.07
2006/0050035 A1 3/2006 Leo et al.
2006/0279514 A1 * 12/2006 Yokota et al. ................ 345/100
2007/0134830 A1 6/2007 Park et al.
2008/0316149 A1 * 12/2008 Kim et al. ...................... 345/76

FOREIGN PATENT DOCUMENTS

EP 1622259 A1 2/2006
JP 56-077887 6/1981
JP 01-094391 4/1989
JP 09-329806 12/1997
JP 2002-250937 9/2002
JP 2004-354742 12/2004
JP 2006-010897 1/2006

* cited by examiner

*Primary Examiner* — Bipin Shalwala
*Assistant Examiner* — Benyam Ketema
(74) *Attorney, Agent, or Firm* — Louis Woo

(57) ABSTRACT

A liquid crystal display apparatus is composed of a plurality of pixels, a plurality of switches and a driver circuit for driving the plurality of switches. Each of the plurality of pixels is provided with a liquid crystal element in which a liquid crystal layer is sandwiched between a pixel driving electrode and a common electrode confronting with each other, a first sampling and holding circuit, a second sampling and holding circuit and a switching device. The switching device switches a positive image signal voltage and a negative image signal voltage, and supplies the positive and negative image signal voltages alternately to the pixel driving electrode.

19 Claims, 20 Drawing Sheets

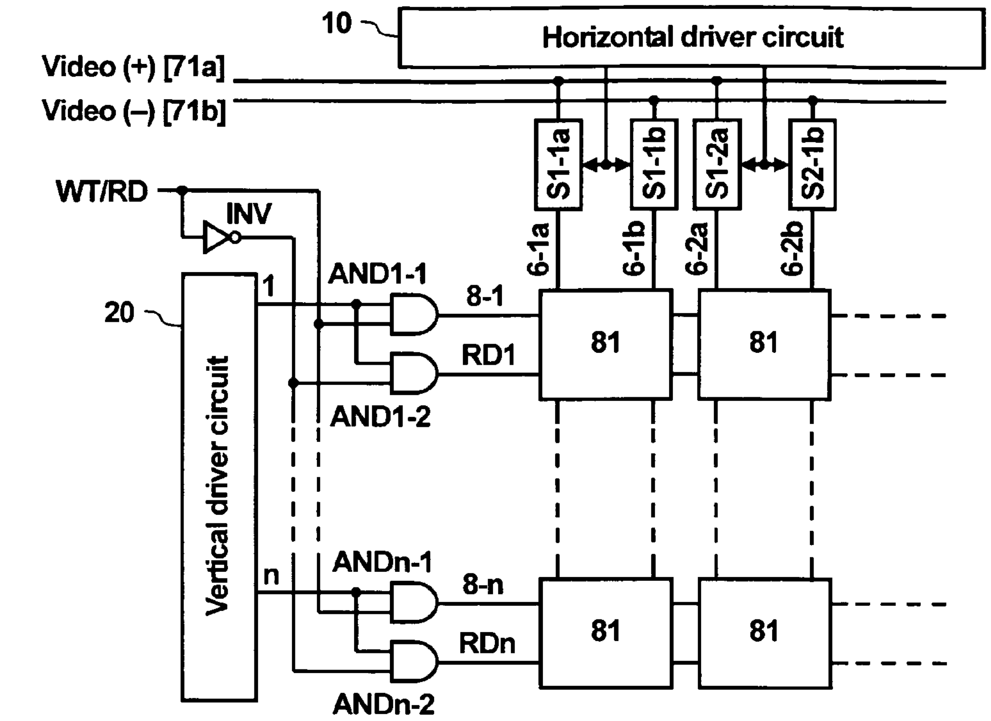
FIG. 6
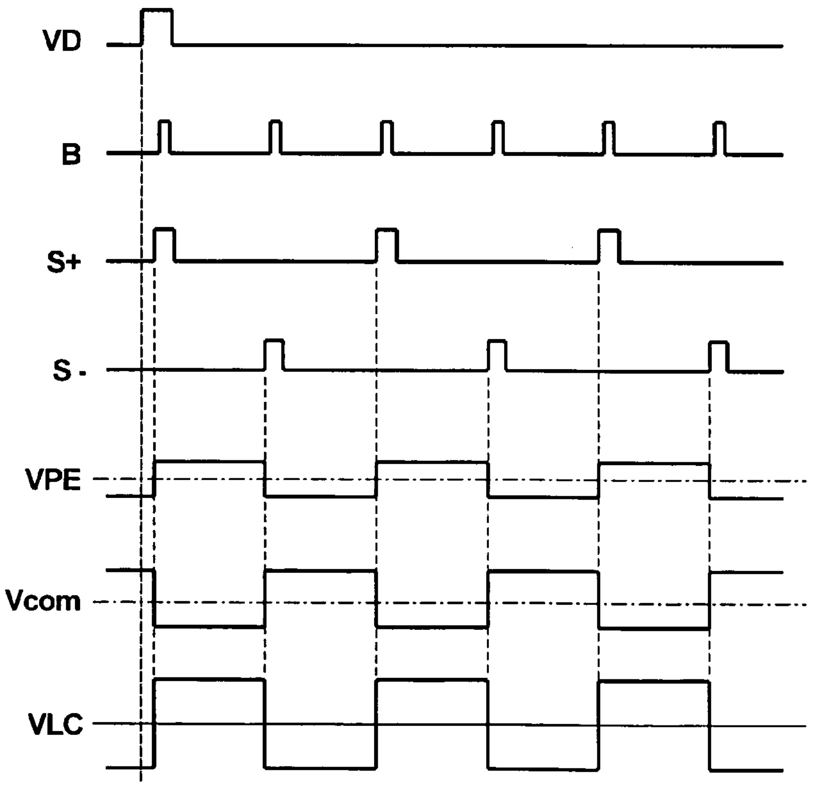
FIG. 7(a)
FIG. 7(b)
FIG. 7(c)
FIG. 7(d)
FIG. 7(e)
FIG. 7(f)
FIG. 7(g)

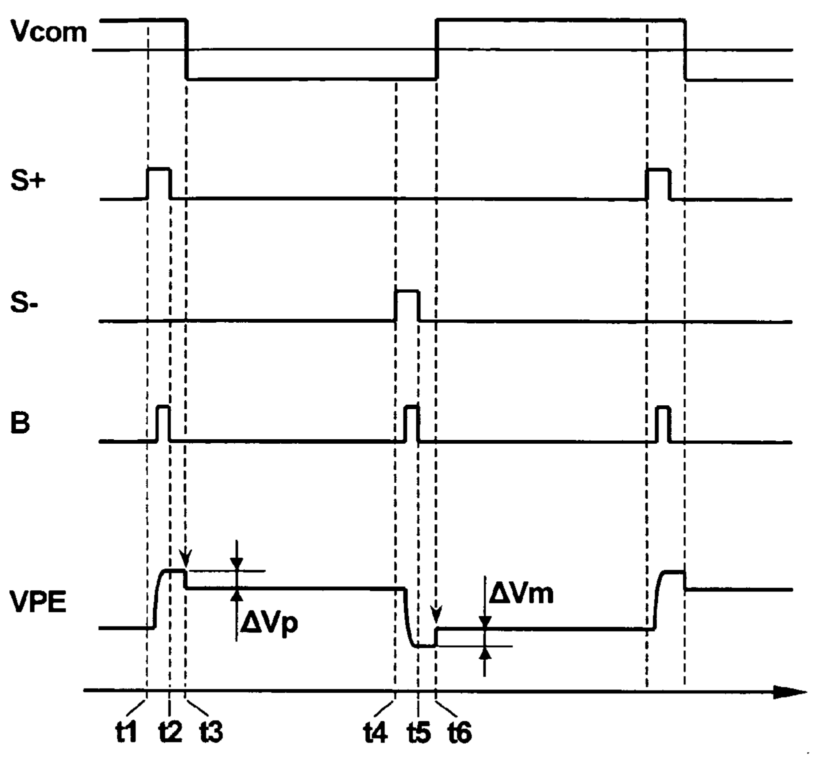
FIG. 11(a1)
FIG. 11(b1)
FIG. 11(c1)
FIG. 11(d1)
FIG. 11(e1)
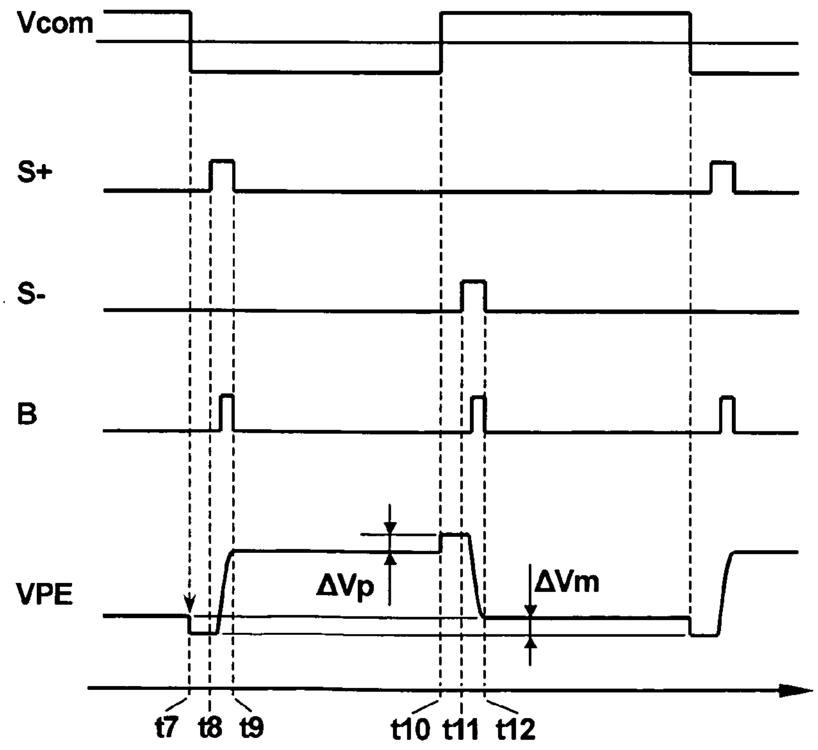
FIG. 11(a2)
FIG. 11(b2)
FIG. 11(c2)
FIG. 11(d2)
FIG. 11(e2)

VD
HD
Vcom
B
S+
S-
VPE
VLC
[k-th frame]
[(k+1)-th frame]
vsp
n-hsp
1 2 3
n
n+1 n+2
2n
2n+1
3n

LIQUID CRYSTAL DISPLAY APPARATUS, AND DRIVING CIRCUIT AND DRIVING METHOD THEREOF

BACKGROUND OF THE INVENTION

1. Field of the Invention

This invention relates to a liquid crystal display apparatus, and a driving circuit and driving method thereof, particularly, relates to an active matrix liquid crystal display apparatus, and a driving circuit and driving method thereof.

2. Description of the Related Art

Recently, a liquid crystal on silicon (LCOS) type liquid crystal display apparatus has been commonly used in a projector and a projection television (TV) as a major component for projecting an image on a screen.

The LCOS type liquid crystal display apparatus is formed in a structure of layering with a transparent electrode, a liquid crystal layer, a reflection electrode disposed in matrix, and a liquid crystal driving element formed with a liquid crystal driving circuit on a silicon circuit board.

FIG. 22(*a*) is one example of a fundamental constitutional diagram of a liquid crystal driving element used in a conventional liquid crystal display apparatus according to the prior art.

FIG. 22(*b*) is a partially enlarged block diagram of the liquid crystal driving element showing an elliptical area "Z" in FIG. 22(*a*).

FIG. 23 is one exemplary block diagram of a liquid crystal element constituting a pixel of a conventional liquid crystal display apparatus according to the prior art.

The liquid crystal driving element shown in FIG. 22(*a*) is composed of a horizontal driver circuit 310, a vertical driver circuit 320, a horizontal signal line 305 that supplies an image signal 71 inputted externally to each of video switches S301-1, S301-2 and S301-3 (hereinafter generically referred to as video switch S301), a pixel section 330, data lines 306-1, 306-2 and 306-3 (hereinafter generically referred to as data line 306), a common electrode line 307, and gate lines 308-1, 308-2 and 308-3 (hereinafter generically referred to as gate line 308), wherein a reference sign 375 denotes a pixel selection driving section. In FIG. 22(*a*), a suffix number succeeding a hyphenated reference sign such as 301-1 and 301-2 exhibits the same component but they are arranged in different sections.

Further, FIG. 22(*a*) shows a part of the liquid crystal driving element.

The pixel section 330 is further composed of a plurality of pixels 11-13, 21-23 and 31-33, which is disposed at each intersection of each data line and each gate line respectively. As shown in FIG. 22(*b*), each pixel is composed of a pixel selection transistor 302, a signal holding capacitor 303 and a reflection electrode 304 respectively. In the case of the liquid crystal driving element shown in FIG. 23, each pixel is composed of a pixel selection transistor "Q", a signal holding capacitor Cs and a reflection electrode PE respectively. A gate and a drain terminals of the pixel selection transistor 302 or "Q" is connected to the gate line 308 or "G" that functions as a line scanning line and the data line 306 or "D" respectively.

Further, as shown in FIG. 23, a liquid crystal element is composed of the reflection electrode or pixel driving electrode PE (hereinafter generically referred to as pixel driving electrode PE), an opposed electrode or common electrode CE (hereinafter generically referred to as common electrode CE) that confronts with the pixel driving electrode PE and a liquid crystal displaying substance or liquid crystal layer LCM (hereinafter generically referred to as liquid crystal layer LCM) that is sandwiched between the pixel driving electrode PE and the common electrode CE.

In FIG. 22(*a*), a controller 360 provides various kinds of clock signals, which are generated so as to synchronize with the image signal 71, to the horizontal driver circuit 310 and the vertical driver circuit 320 respectively. However, a providing route of the clock signals is not shown in FIG. 22(*a*).

Further, by driving the data line 306 and the gate line 308 in synchronism with the image signal 71, the controller 360 conducts pixel selection involving each scanning in horizontal and vertical directions.

When one pixel disposed at an intersection of the data line 306 and the gate line 308 is selected as mentioned above, the image signal 71 inputted externally is written into the signal holding capacitor 303 by way of the video switch S301, the data line 306 and the pixel selection transistor 302 in the vertical direction disposed in each pixel. Then, the liquid crystal layer LCM is driven by the pixel driving electrode 304 that is connected to the signal holding capacitor 303.

By applying a fixed voltage Vcom to the common electrode CE and supplying various voltages in response to an image signal to the pixel driving electrode PE, the liquid crystal element shown in FIG. 23 controls percentage modulation of light of the liquid crystal layer LCM and displays as an image. Generally, an AC (alternate current) driving method results in improving reliability of a liquid crystal element in longer stability. Consequently, an AC driving method is conducted to the liquid crystal element shown in FIG. 23 by applying positive and negative voltages, which make percentage modulation of light equal in response to an image signal, alternately to the pixel driving electrode PE.

In some cases, a voltage of a common electrode is changed in synchronism with timing of driving a pixel driving electrode by positive and negative voltages for the purpose of reducing a dynamic range of an image signal. However, basic concept is the same.

In the case of the liquid crystal driving element such as one example shown in FIG. 22(*a*), writing an image signal into each pixel is generally conducted once a frame. In other words, by writing positive and negative image signals into the signal holding capacitor 303 or Cs alternately per one frame, the liquid crystal is driven by AC.

In addition, there exists a double speed driving method, wherein liquid crystal is driven by a frequency double the writing frequency mentioned above. In this case, the driving frequency is such that two times the writing frequency 60 Hz equals 120 Hz. In any cases, the driving frequency is not so high.

Writing an image signal into the signal holding capacitor 303 or Cs is conducted by charging or discharging the signal holding capacitor 303 or Cs in relation to parasitic capacitance between ON resistance of the video switch S301 and the data line 306 or parasitic capacitance between ON resistance of the pixel selecting transistor 302 or "Q" and the signal holding capacitor 303 or Cs. Consequently, increasing the writing frequency more is not easy in consideration of element cost.

On the other hand, in the case of a liquid crystal element, if a DC (direct current) component passing across the pixel driving electrode 304 or PE and the common electrode CE enabled to reduce to zero by driving the liquid crystal by a higher frequency, reliability of the liquid crystal display apparatus is improved in preventing from burn-in, and resulted in improving quality of displaying an image.

Various methods of preventing a written-in signal component from deteriorating have been disclosed until now. The Japanese publication of unexamined patent application No.

2006-10897 disclosed the countermeasure for reducing influence on feed-through caused by parasitical capacitance of a pixel selection transistor.

Further, the Japanese publication of unexamined patent application No. 2002-250938 disclosed the countermeasure for reducing leak current of a signal holding capacitor. However, a method of driving liquid crystal by higher frequency has not been studied.

In addition, the Japanese publication of unexamined patent application No. 2004-354742 disclosed the liquid crystal display that prevented image quality from deteriorating. According to the publication, the liquid crystal display apparatus is prevented from the generation of deterioration of image quality caused by potential variation of a common electrode line and a common electrode by alternately connecting storage capacitance of respective pixels provided at the same scanning line to a storage capacitance line corresponding to the scanning line and another storage capacitance line adjacent to the scanning line every fixed plural pieces of storage capacitance and reversing polarities of compensation voltage at every storage capacitance line.

As mentioned above, it is preferable that a liquid crystal element is driven by a higher frequency in order to improve reliability such as preventing a liquid crystal display from burn-in. However, it is rather difficult to write positive and negative image signals against a common electrode voltage alternately in higher speed due to restriction of writing time with respect to a pixel.

Accordingly, a frequency of the AC driving method has been fixed to a frame rate or two times the frame rate.

Further, in the case of the liquid crystal display disclosed in the Japanese publication of unexamined patent application No. 2004-354742, there exists a problem such that polarity of the compensating voltage can be reversed at each frame.

Furthermore, there exist another problem such that an image signal voltage requires two types of voltages, positive and negative voltages with respect to the voltage Vcom of the common electrode.

SUMMARY OF THE INVENTION

Accordingly, in consideration of the above-mentioned problems of the prior arts, an object of the present invention is to provide a liquid crystal display apparatus, and a driver circuit and a driving method thereof, which enables to drive liquid crystal in higher speed than ever by an AC (alternate current) driving method and improve allowable degree of variation of liquid crystal and productivity of the liquid crystal display apparatus by applying two types of voltages corresponding to positive and negative polarity and reversing polarity of the voltages at a rate of tens times a frame frequency in an analog driving type liquid crystal display apparatus.

In order to achieve the above object, the present invention provides, according to an aspect thereof, a liquid crystal display apparatus comprising: a plurality of pixels disposed at each intersection of plural pairs of data lines and a plurality of gate lines; a plurality of switches provided to each of the plural pairs of data lines supplying a positive image signal to one data line of a pair of data lines and a negative image signal to the other data line of the pair of data lines with respect to each pair of the plural pairs of data lines sequentially one by one; and driver means in the horizontal and vertical directions for driving the plurality of switches in the horizontal direction by each pair of data lines within a horizontal scanning period and for selecting the plurality of gate lines in the vertical direction at each horizontal scanning period; wherein each of the plurality of pixels is provided with: a liquid crystal element having a liquid crystal layer sandwiched between a pixel driving electrode and a common electrode confronting with each other; a first sampling and holding means for sampling the positive image signal and holding a voltage of the sampled positive image signal for a prescribed period of time; a second sampling and holding means for sampling the negative image signal and holding a voltage of the sampled negative image signal for the prescribed period of time; and a switching means for switching a positive image signal voltage held in the first sampling and holding means and a negative image signal voltage held in the second sampling and holding means in a prescribed period shorter than a vertical scanning period and supplying the positive and negative image signal voltages alternately to the pixel driving electrode.

According to another aspect of the present invention, there provided a data line driving circuit of a liquid crystal display apparatus comprising: a shift register circuit sequentially storing a digital image signal that is plural bits of pixel data synthesized in time sequence-wise; a latch circuit storing one line of digital image signals to be sequentially stored in the shift register circuit for one horizontal scanning period; a gradation counter outputting reference gradation data in which a plurality of gradation values sequentially changes in the horizontal scanning period; a comparator generating a coincident pulse when a value of one line of the pixel data outputted from the latch circuit coincides with a gradation value of the reference gradation data outputted from the gradation counter after comparing both values; a reference voltage generator circuit generating a first reference voltage that is a periodical sweep signal changing in a direction of increasing a level of an image from a black level to a white level in the horizontal scanning period or in a direction of decreasing the level from a white level to a black level in the horizontal scanning period and a second reference voltage that is a periodic sweep signal having a reverse relation to the first reference voltage with respect to a prescribed potential; and a plurality of analog switches provided on each pair of data lines in a pixel disposed in the same row out of plural pairs of gate lines connected to each intersection of a plurality of pixels and a plurality of gate lines, sampling the first and second reference voltages respectively on the basis of the coincide pulse, and generating a driving signal having a level corresponding to generation timing of the coincide pulse, and then outputting the driving signal; wherein the first reference voltage is commonly inputted into each first input terminals of the plurality of analog switches and the second reference voltage is commonly inputted into each second input terminals of the plurality of analog switches, and wherein the plurality of analog switches outputs a first driving signal obtained by sampling the first reference voltage on the basis of the coincide pulse with respect to one data line of each pair of data lines provided to corresponding input terminals at the same time outputs a second driving signal obtained by sampling the second reference voltage on the basis of the coincide pulse with respect to the other data line.

According to further aspect of the present invention, there provided a driving method of a liquid crystal display apparatus comprising the steps of: first sampling for sampling a driving voltage corresponding to a positive image signal to be transmitted through one data line of each pair of data lines in each of a plurality of pixels disposed at each intersection of plural pairs of data lines and a plurality of gate lines for a prescribed period shorter than a vertical scanning period and for holding the sampled driving voltage for a first prescribed period of time; second sampling for sampling a driving voltage corresponding to a negative image signal to be transmitted through the other data line of each pair of data lines in each of the plurality of pixels disposed at each intersection of the plural pairs of data lines and the plurality of gate lines for the prescribed period shorter than the vertical scanning period and for holding the sampled driving voltage for the first prescribed period of time; first impedance converting for making active a first buffer amplifier converting impedance of the held positive image signal voltage for a second prescribe period of time in synchronism with the sampling process in the step of first sampling; second impedance converting for making active a second buffer amplifier converting impedance of the held negative image signal voltage for the second prescribe period of time in synchronism with the sampling process in the step of second sampling; and applying pixel driving electrode voltage for applying the positive and negative image signal voltages of which impedance is converted through the impedance conversion processes in the steps of first and second impedance converting, alternately to each pixel driving electrode of each pixel disposed in the plurality of pixels.

Other object and further features of the present invention will be apparent from the following detailed description when read in conjunction with the accompanying drawings.

BRIEF DESCRIPTION OF THE DRAWINGS

FIG. 6 is a block diagram of a major part of a liquid crystal display apparatus adopting the pixel circuit shown in FIG. 5 according to the third embodiment of the present invention.

FIGS. 7(*a*)-7(*g*) are timing charts explaining an outline of AC (alternate current) driving control of the present invention.

FIGS. 11(*a*1)-11(*e*2)) are timing charts exhibiting one example of optimizing relative timing control of switching polarity of a pixel driving electrode and a common electrode in the liquid crystal display apparatus according to a fifth embodiment of the present invention.

FIG. 22(*b*) is a partially enlarged block diagram of the liquid crystal driving element showing an elliptical area "Z" in FIG. 22(*a*).

DETAILED DESCRIPTION OF THE INVENTION

First Embodiment

Figure 1:
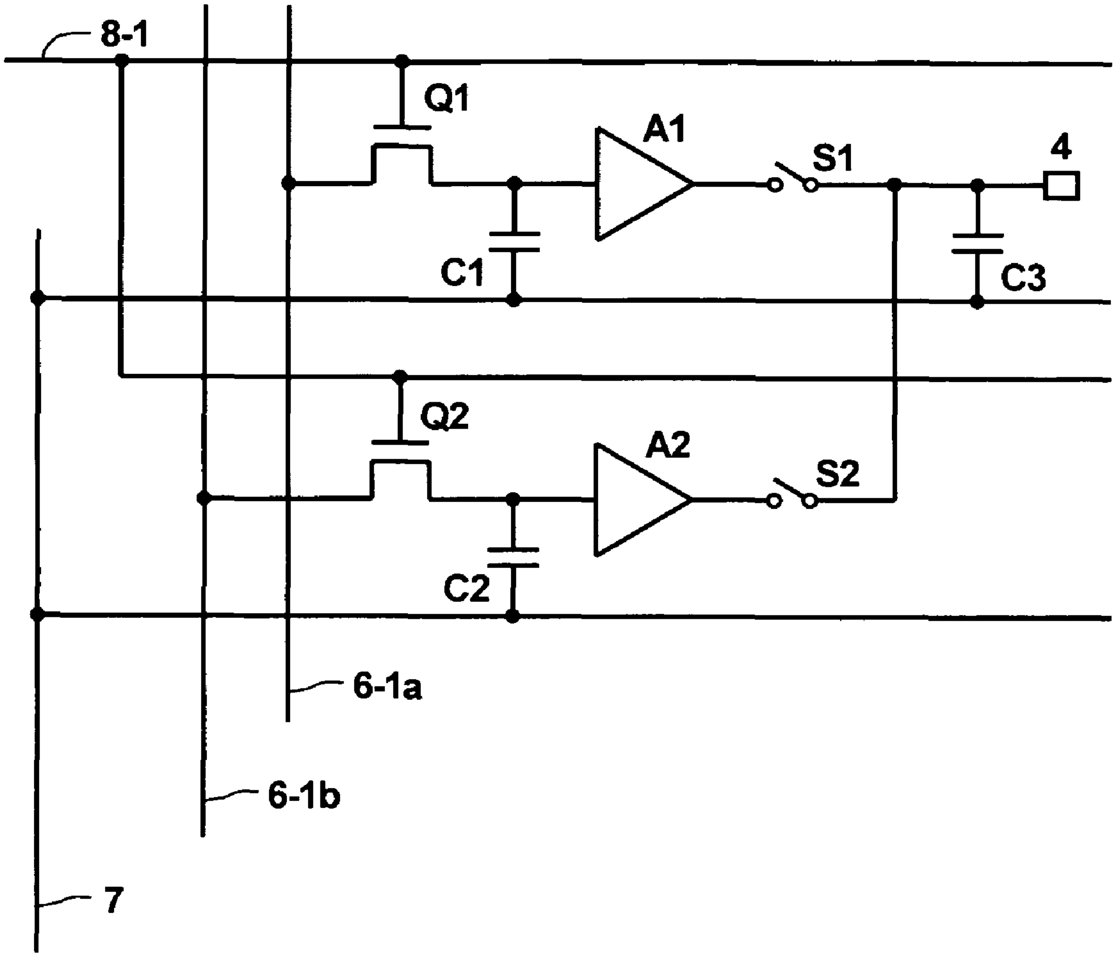
FIG. 1 is a block diagram of a pixel circuit in a liquid crystal display apparatus according to a first embodiment of the present invention.
Figure 2:
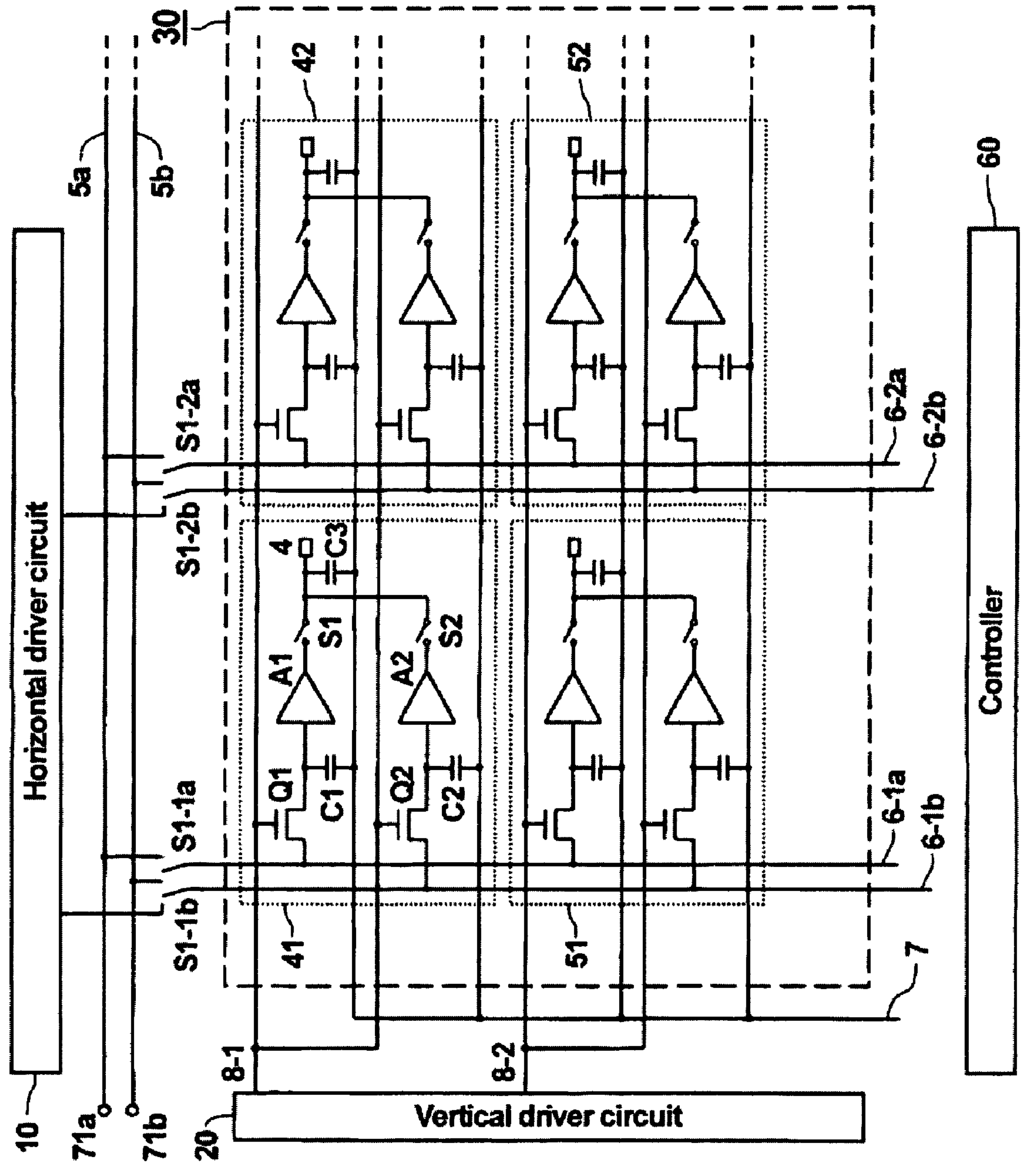
FIG. 2 is a fundamental constitutional drawing of a liquid crystal driving element adopting the pixel circuit shown in FIG. 1 according to the first embodiment of the present invention.
Figure 3:
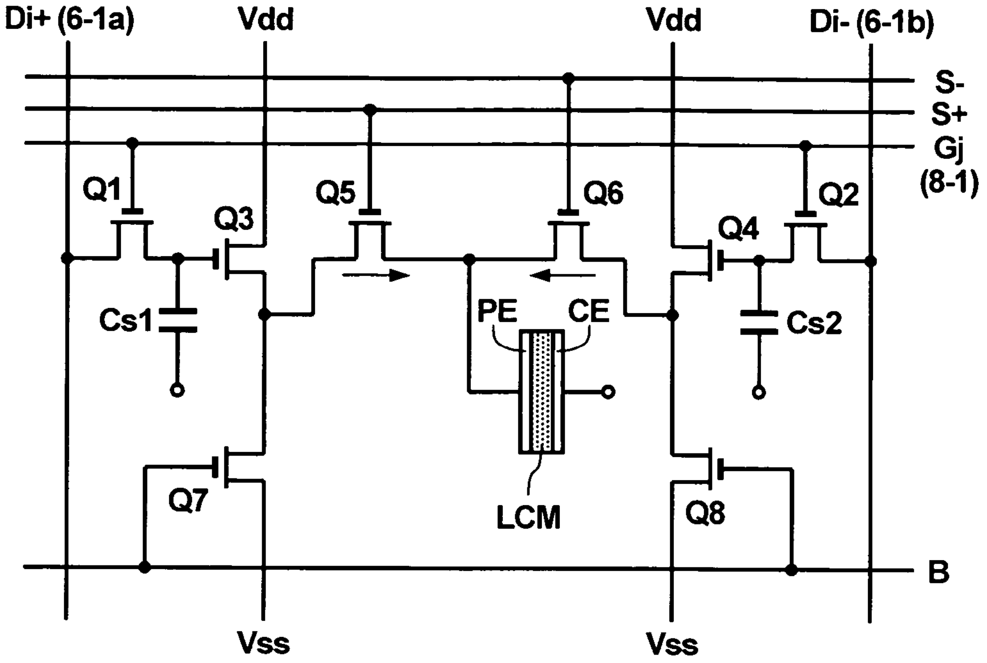
FIG. 3 is a detailed block diagram of the pixel circuit shown in FIG. 1.

In reference to FIGS. 1-3, a pixel circuit used in a liquid crystal display apparatus according to a first embodiment of the present invention is described in detail.

FIG. 1 is a block diagram of a pixel circuit in a liquid crystal display apparatus according to a first embodiment of the present invention.

FIG. 2 is a fundamental constitutional drawing of a liquid crystal driving element adopting the pixel circuit shown in FIG. 1 according to the first embodiment of the present invention.

FIG. 3 is a detailed block diagram of the pixel circuit shown in FIG. 1.

In FIGS. 1 and 2, a same reference sign is given to a same component.

Each pixel disposed in a liquid crystal display apparatus according to the present invention is composed of a pixel circuit shown in FIG. 1. As shown in FIG. 1, the pixel circuit is composed of two pixel selection transistors Q1 and Q2, two holding capacitors C1 and C2, two buffer amplifiers A1 and A2, a holding capacitor C3, two switches S1 and S2 and a reflection electrode (hereinafter referred to as pixel driving electrode) 4. Each drain terminal of the pixel selection transistors Q1 and Q2 is connected to data lines 6-1*a* and 6-1*b* respectively. Each gate terminal of the pixel selection transistor Q1 and Q2 is connected to a gate line 8-1. Each one terminal of the holding capacitors C1 and C2 is connected to a source terminal of the pixel selection transistors Q1 and Q2 respectively. Each of the other terminals of the holding capacitors C1 and C2 is connected to a common electrode line 7 respectively. Each input terminal of the buffer amplifiers A1 and A2 is connected to each connecting point between each drain terminal of the pixel selection transistors Q1 and Q2 and each one terminal of the holding capacitors C1 and C2 respectively. Each one terminal of the switches S1 and S2 is connected to each output terminal of the buffer amplifiers A1 and A2 respectively. One terminal of the holding capacitor C3 is connected to a common connecting point of the other terminals of the switches S1 and S2 and the other terminal of the holding capacitor C3 is connected to the common electrode line 7. The pixel driving electrode 4 is connected to the one terminal of the holding capacitor C3.

Figure 23:
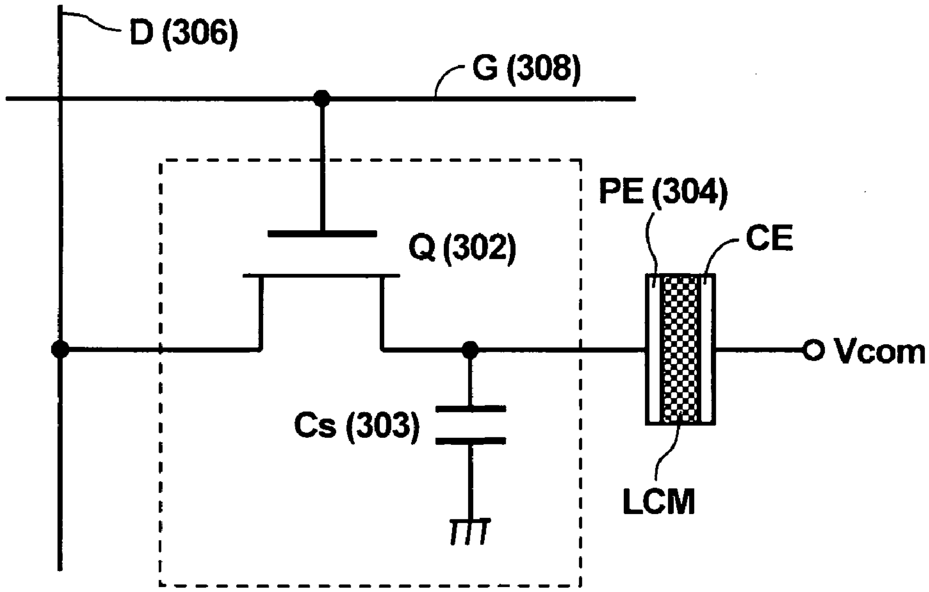
FIG. 23 Prior Art
FIG. 23 is one exemplary block diagram of a liquid crystal element constituting a pixel of a conventional liquid crystal display apparatus according to the prior art.

Further, a liquid crystal element including the pixel driving electrode 4 according to the first embodiment of the present invention is such a liquid crystal element having commonly known configuration as shown in FIG. 23.

More specifically, the liquid crystal element of the present invention is formed in a structure composed of the pixel driving electrode 4 corresponding to the pixel driving electrode PE and a liquid crystal displaying substance or liquid crystal layer LCM that is sandwiched between the pixel driving electrode PE and an opposed electrode or common electrode CE that confronts with the pixel driving electrode PE.

Figure 22A:
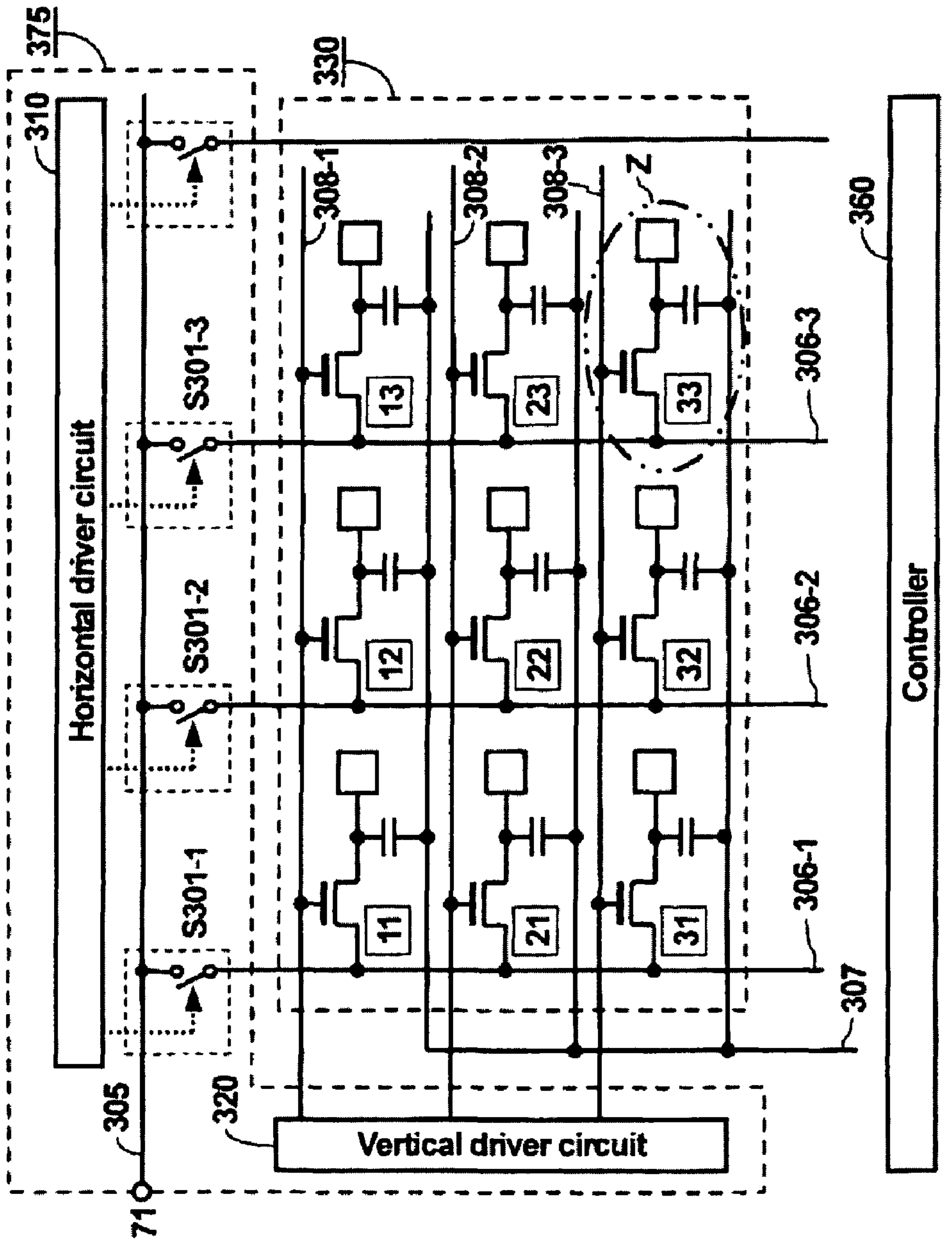
FIG. 22(a) Prior Art
FIG. 22(*a*) is one example of a fundamental constitutional diagram of a liquid crystal driving element used in a conventional liquid crystal display apparatus according tot the prior art.
Figure 22B:
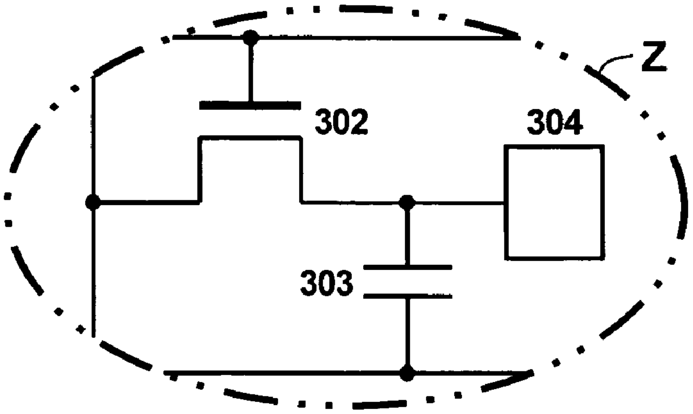
FIG. 22(b) Prior Art

A fundamental configuration of a liquid crystal driving element according to the first embodiment of the present invention is shown in FIG. 2. The configuration is basically similar to that of the prior art shown in FIG. 22(*a*). However, in the case of the present invention, as shown in FIG. 2, a horizontal signal line, a data line and a switch are provided in two systems respectively.

More specifically, the liquid crystal driving element according to the first embodiment of the present invention is composed of a horizontal driver circuit 10, a vertical driver circuit 20, a pixel section 30, a controller 60 and two systems of horizontal sampling switches (S1-1*a*)-(S1-1*b*) and (S1-2*a*)-(S1-2*b*). The pixel section 30 is composed of a plurality of pixel circuits 41, 42, 51, and 52.

Further, the liquid crystal element is composed of two systems of horizontal signal lines 5*a* and 5*b*, two systems of data lines (6-1*a*)-(6-2*a*) and (6-1*b*)-(6-2*b*), a common electrode line 7, and gate lines 8-1 and 8-2. The horizontal signal lines 5*a* and 5*b* supply positive side of an image signal with respect to a voltage of a common electrode (hereinafter referred to as positive image signal 71*a*) and a negative side of the image signal with respect to the voltage of the common electrode (hereinafter referred to as negative image signal 71*b*) to the horizontal sampling switches (S1-1*a*)-(S1-2*a*) and (S1-1*b*)-(S1-2*b*) respectively.

Furthermore, in FIG. 2, a suffix number succeeding a hyphenated reference sign such as 8-1 and 8-2 exhibits the same component but they are arranged in different sections.

More, an alphabetic small letter succeeding a suffix number exhibits such that the letter "a" denotes a first system out of two systems and the letter "b" denotes a second system.

Moreover, FIG. 2 shows a part of entire configuration of the liquid crystal driving element.

The pixel section 30 is composed of a plurality of pixels 41, 42, 51 and 52, which is disposed in matrix at each intersection of each of the two systems of data lines 6-1*a*-6-2*a* and 6-1*b*-6-2*b* and each gate lines 8-1 and 8-2 respectively. Each of the pixels 41, 42, 51 and 52 is composed of the same configuration as shown in FIG. 1.

Further, the horizontal driver circuit 10 is connected to each drain terminal of the pixel selection transistors Q1 and Q2 of the pixels 41 and 51 disposed in the first row of the pixel section 30 respectively through the two systems of the horizontal sampling switches S1-1*a* and S1-1*b* and the two systems of the data lines 6-1*a* and 6-1*b*.

Furthermore, similarly to the first row of the pixels 41 and 51 mentioned above, the horizontal driver circuit 10 is also connected to each drain terminal of the pixel selection transistors Q1 and Q2 of the pixels 42 and 52 disposed in the second row of the pixel section 30 respectively through the two systems of the horizontal sampling switches S1-2*a* and S1-2*b* and the two systems of the data lines 6-2*a* and 6-2*b*.

On the other hand, the vertical driver circuit 20 is commonly connected to each gate terminal of the pixel selection transistors Q1 and Q2 of the pixels 41 and 42 disposed in the first line of the pixel section 30 respectively through the gate line 8-1. Similarly to the first line of the pixel section 30, the vertical driver circuit 20 is commonly connected to each gate terminal of each pixel selection transistor of each pixel disposed in the same line of the pixel section 30 respectively through respective gate line.

Further, the controller 60 provides various clock signals, which are generated so as to synchronize with the input image signals 71*a* and 71*b*, to the horizontal driver circuit 10 and the vertical driver circuit 20 respectively. However, providing routes of the clock signals are not shown in FIG. 2.

Furthermore, by driving the data lines 6-1*a*, 6-1*b*, 6-2*a* and 6-2*b* and the gate lines 8-1 and 8-2 respectively in synchronism with the input image signals 71*a* and 71*b*, the controller 60 conducts pixel selection with accompanying each scanning in the horizontal and vertical directions.

Accordingly, the liquid crystal display apparatus according to the embodiment of the present invention enables to conduct AC (alternate current) driving in higher speed with respect to the liquid crystal.

Operations of the pixel circuit shown in FIG. 1 according to the first embodiment of the present invention are described in detail next.

The data line 6-1*a* supplies the positive image signal 71*a* to the image selection transistor Q1. At the same time, the data line 6-1*b* supplies the negative image signal 71*b* to the image selection transistor Q2. The image selection transistors Q1 and Q2 are simultaneously switched ON by a voltage supplied to the gate terminals through the gate line 8-1. When the image selection transistor Q1 is switched ON, the positive image signal 71*a* supplied through the data line 6-1*a* is written in the holding capacitor C1 through the drain and source terminals of the image selection transistor Q1.

On the other hand, the negative image signal 71*b* supplied through the data line 6-1*b* is written in the holding capacitor C2 through the drain and source terminals of the image selection transistor Q2 at the same time the positive image signal is written in the holding capacitor C1.

Succeedingly, the image selection transistors Q1 and Q2 are simultaneously switched OFF by a voltage supplied to the gate terminals of image selection transistors Q1 and Q2 through the gate line 8-1. Consequently, the positive and negative image signals 71*a* and 71*b* are kept holding in the holding capacitors C1 and C2 respectively until next image signals 71*a* and 71*b* are written in the holding capacitors C1 and C2 when the image selection transistors Q1 and Q2 are switched ON in the next.

The positive and negative image signals 71*a* and 71*b* respectively held in the holding capacitors C1 and C2 are read out through the buffer amplifiers A1 and A2, which are impedance converters having high input resistance, respectively and selected by the switches S1 and S2 alternately. Then the liquid crystal is made to be driven by AC with changing a voltage of the pixel driving electrode 4.

By the above-mentioned pixel configuration, once the positive and negative image signals 71*a* and 71*b* have been written in the holding capacitors C1 and C2 on the basis of one time per one frame, the liquid crystal enables to be driven by an AC driving method by alternately switching the switches S1 and S2 any number of times during one frame period until an image signal in a next frame is written in.

In other words, by the pixel circuit according to the first embodiment of the present invention, the liquid crystal enables to be driven by the AC driving method at a high frequency such as tens times the frame frequency independently of a write-in period of an image signal. Consequently, the pixel circuit according to the first embodiment of the present invention makes an effect on such as preventing a liquid crystal display apparatus from burn-in, improving reliability and improving displaying quality for hiding speck and unevenness.

Further, the pixel circuit according to the first embodiment of the present invention enables to change a voltage of the common electrode of the liquid crystal display apparatus in synchronism with reversing polarity. Consequently, a voltage of an image signal enables to be reduced to half the conventional voltage or less.

Furthermore, according to the first embodiment of the present invention, one pixel includes two image selection transistors Q1 and Q2, two buffer amplifiers A1 and A2, two switches S1 and S2 and two holding capacitors C1 and C2, so that a number of elements in one pixel is relatively large. However, the liquid crystal display apparatus according to the first embodiment of the present invention enables to be manufactured by using the standard CMOS (Complimentary Metal Oxide Semiconductor) manufacturing process. Consequently, increasing a number of elements does not exactly result in increasing manufacturing cost.

On the other hand, each pixel contains the buffer amplifiers A1 and A2. In case DC current is kept flowing the buffer amplifiers A1 and A2 continuously even though it is small current, adverse affection such as increasing power consumption and heat emission may be arise because a liquid crystal driving element normally contains more than one million pixels in total.

A pulse driving method is effective for preventing such an adverse affection. The pulse driving method makes the buffer amplifiers A1 and A2 and the switches S1 and S2 to be enable during a period necessary for reading out an image signal. The holding capacitor C3 is provided for conducting the pulse driving method. An image signal is written in the holding capacitor C3 through the switches S1 and S2 during an enable period while the switches S1 and S2 are switched ON. When the switches S1 and S2 are switched OFF, the image signal written in the holding capacitor C3 is kept holding while the liquid crystal is driven. Consequently, the liquid crystal enables to be driven by the AC driving method in a higher frequency than the conventional frequency while power consumption is suppressed in increasing.

Accordingly, the liquid crystal display apparatus of the present invention enables to realize the above-mentioned effects.

FIG. 3 is a detailed block diagram of the pixel circuit shown in FIG. 1. As shown in FIG. 3, one pixel circuit in the liquid crystal display apparatus according to the first embodiment of the present invention is composed of two pixel selection transistors Q1 and Q2 for writing positive and negative image signals, two holding capacitors Cs1 and Cs2 for holding an image signal in respective polarity that correspond to the holding capacitors C1 and C2 in FIG. 1, six transistors Q3-Q8 and a liquid crystal element of which configuration is similar to that shown in FIG. 23. The liquid crystal element is composed of a pixel driving electrode PE, a common electrode CE that confronts with the pixel driving electrode PE and a liquid crystal layer LCM that is sandwiched between the pixel driving electrode PE and the common electrode CE.

The transistors Q3 and Q7 function as a source follower circuit for converting impedance, and constitute the buffer amplifier A1 shown in FIG. 1. The transistors Q4 and Q8 also function as a source follower circuit for converting impedance and constitute the buffer amplifier A2 shown in FIG. 1.

Further, the transistor Q5 of which the drain terminal is connected to the source terminal of the transistor Q3, and the transistor Q6 of which the drain terminal is connected to the source terminal of the transistor Q4, respectively function as switching transistors corresponding to the switches S1 and S2 shown in FIG. 1. Each source terminal of the transistors Q5 and Q6 is connected to the pixel driving electrode PE of the liquid crystal element.

Furthermore, the holding capacitor C3 in FIG. 1 is not shown in FIG. 3. However, the holding capacitor C3 enables to be substituted by parasitic capacitance of the transistors Q5 and Q6 and another parasitic capacitance of the liquid crystal. In addition, the holding capacitor C3 is not necessary to be produced in case leak current flowing through a node of the pixel driving electrode PE is sufficiently small.

A data line in the pixel section is constituted by one pair of two data lines at each pixel circuit such as a data line Di+ for positive polarity (hereinafter referred to as positive data line) and another data line Di− for negative polarity (hereinafter referred to as negative data line). The positive and negative data lines Di+ and Di− are provided with image signals of which polarity is different from each other, wherein the image signals are sampled by a not shown data line driving circuit. Each drain terminal of the pixel selection transistors Q1 and Q2 is connected to the positive data line Di+ corresponding to the data line 6-1*a* in FIG. 1 and the negative data line Di− corresponding to the data line 6-1*b* in FIG. 1 respectively. Each gate terminal of the pixel selection transistors Q1 and Q2 is connected to a line scanning line Gj corresponding to the gate line 8-1 in FIG. 1 with respect to the same pixel line.

Further, each drain terminal of the transistors Q3 and Q4 is supplied with a drain voltage Vdd respectively.

Furthermore, each source terminal of the transistors Q7 and Q8 is supplied with a source voltage Vss respectively.

When a scanning pulse is supplied from a not shown vertical scanning circuit, the pixel selection transistors Q1 and Q2 are simultaneously switched ON, and the holding capacitors Cs1 and Cs2 hold positive and negative image signal voltages respectively. A circuitry section constituted by the transistors Q3 and Q7 and another circuitry section constituted by the transistors Q4 and Q8 function as so-called source follower buffers, wherein the transistors Q3 and Q4 are signal input transistors and the transistors Q7 and Q8 function as constant current source loads. Each gate of the transistors Q7 and Q8 for the constant current source load is commonly connected to a wiring B in a pixel line direction (hereinafter referred to as line B) with respect to pixels in the same line, and the transistors Q7 and Q8 are constituted so as to enable to control bias of the constant current source load. Each input resistance of the source follower buffers constituted by the CMOS type transistors Q3-Q7 and Q4-Q8 is almost infinitive. Consequently, electric charge held in the holding capacitors Cs1 and Cs2 is kept holding without leaking until another image signal is newly written in after one vertical scanning period has elapsed.

The switching transistors Q5 and Q6 transmit image signals outputted from the source follower buffers to the pixel display section constituted by the pixel driving electrode PE, the Liquid crystal layer LCM and the common electrode CE by switching polarity of the image signal. Each gate terminal of the transistor Q5 for switching a positive image signal and the transistor Q6 for switching a negative image signal is isolated from each other, and connected to a wiring S+ in a pixel line direction (hereinafter referred to as line S+) and another wiring S− in the pixel line direction (hereinafter referred to as line S−) respectively with respect to pixels in the same line.

A gate control signal alternately supplied to the lines S+ and S− makes the switching transistors Q5 and Q6 switch ON alternately, and enables to supply a liquid crystal driving signal that inverts its polarity into positive or negative to a pixel driving section. In the case of the conventional active matrix liquid crystal display apparatus, polarity inversion can not be realized except for during the vertical scanning period. However, in the case of the liquid crystal display apparatus according to the first embodiment of the present invention, the pixel circuit itself is provided with a function for inverting polarity.

Accordingly, by controlling the function in higher speed, the AC driving method in a higher frequency enables to be realized without any restriction of vertical scanning frequency.

Second Embodiment

With referring to FIG. 4, another pixel circuit according to a second embodiment of the present invention is described in detail next.

Figure 4:
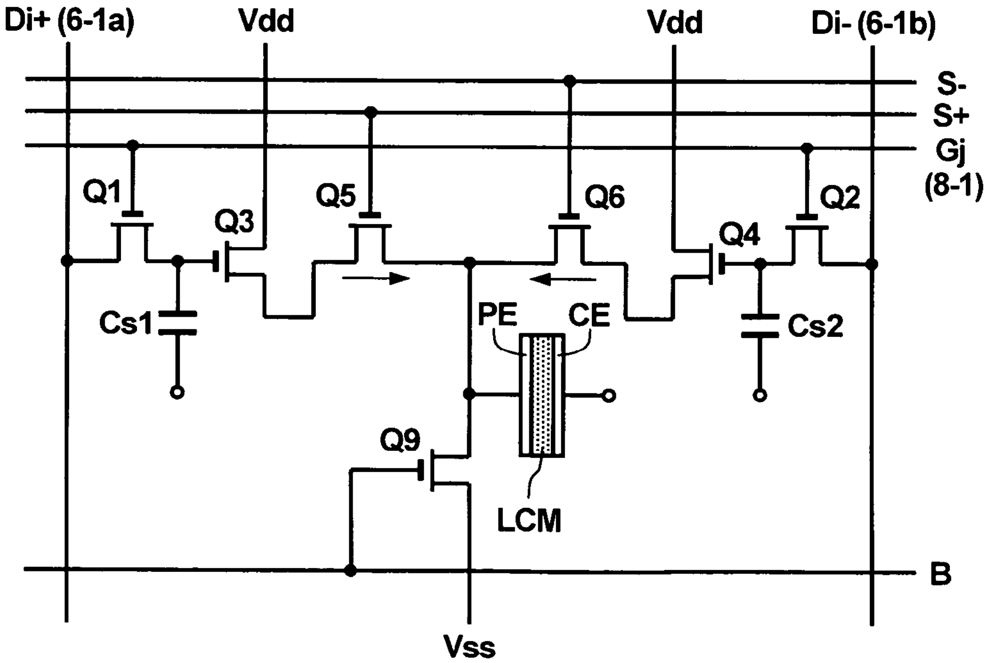
FIG. 4 is a detailed block diagram of a pixel circuit in a liquid crystal display apparatus according to a second embodiment of the present invention.

FIG. 4 is a detailed block diagram of a pixel circuit in a liquid crystal display apparatus according to the second embodiment of the present invention. In FIG. 4, the same component as in FIG. 3 is denoted by the same reference sign and its description is omitted. Fundamental configuration and function of the pixel circuit shown in FIG. 4 are similar to those of the pixel circuit shown in FIGS. 1 and 2. Consequently, details of the same functions and operations as in FIGS. 1 and 2 are omitted.

The pixel circuit shown in FIG. 4 is characterized in that a transistor Q9 for constant current load that constitutes a source follower buffer is disposed in a succeeding stage of the switching transistors Q5 and Q6 for switching polarity. In other words, the transistor Q9 is disposed in a node of the pixel driving electrode PE and commonly functions as a load for both the positive and negative source follower circuits.

Accordingly, the number of transistors disposed in the pixel circuit according to the second embodiment of the present invention is smaller than that of the pixel circuit shown in FIG. 3 according to the first embodiment of present invention by one.

Further, the pixel circuit according to the second embodiment of the present invention enables to suppress characteristic difference between positive and negative polarities caused by respective variation of load resulted by the positive buffer amplifier and the negative buffer amplifier.

Third Embodiment

With referring to FIGS. 5 and 6, a further pixel circuit according to a third embodiment of the present invention is described in detail next.

Figure 5:
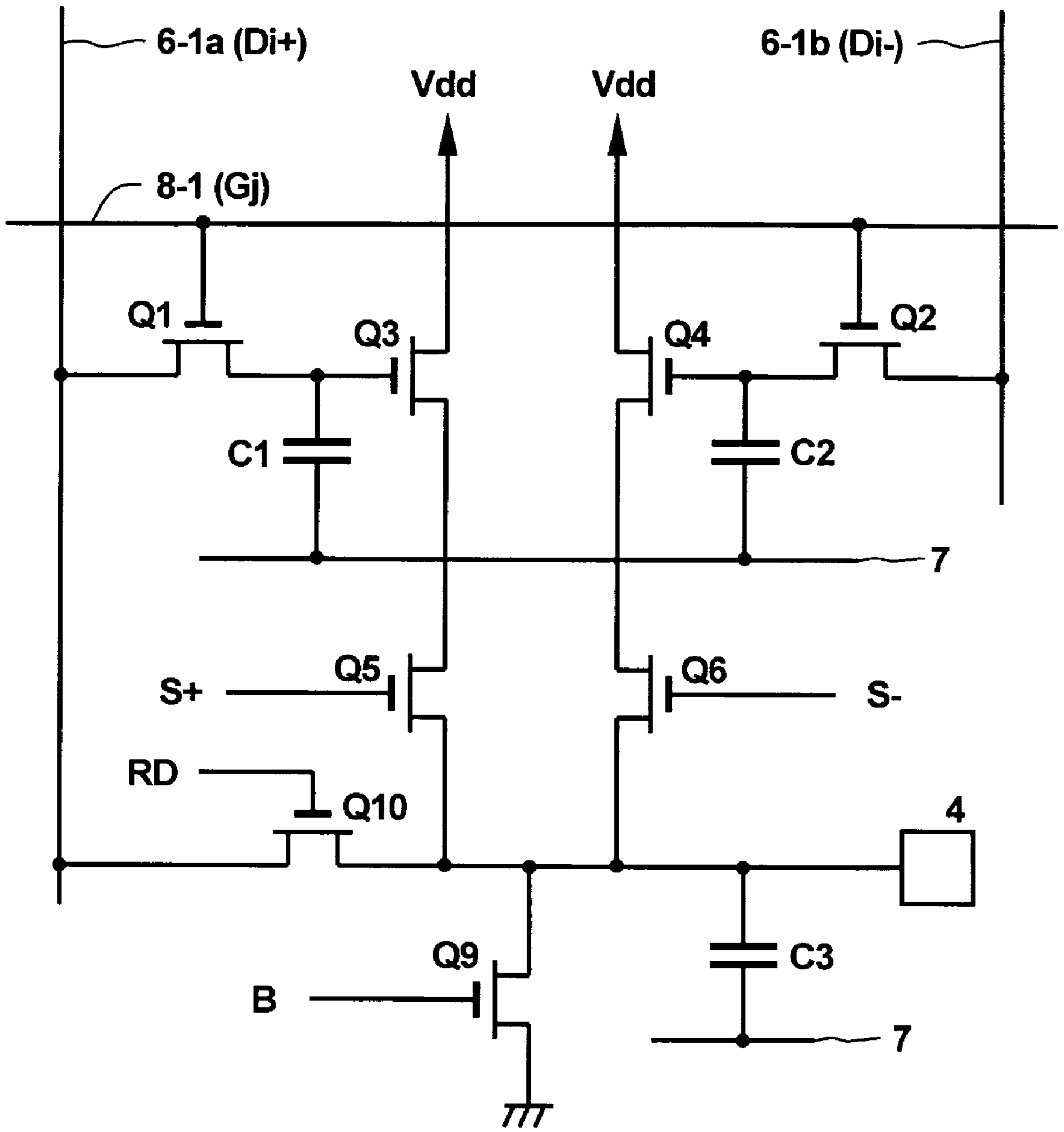
FIG. 5 is a block diagram of a pixel circuit in a liquid crystal display apparatus according to a third embodiment of the present invention.

FIG. 5 is a block diagram of a pixel circuit in a liquid crystal display apparatus according to the third embodiment of the present invention.

FIG. 6 is a block diagram of a major part of a liquid crystal display apparatus adopting the pixel circuit shown in FIG. 5 according to the third embodiment of the present invention. In FIGS. 5 and 6, the same component as shown in FIGS. 1 and 2 is denoted by the same reference sign and its detailed description is omitted.

The pixel circuit shown in FIG. 5 according to the third embodiment of the present invention is characterized in that a transistor Q10 as a switching device for inspection is further provided between the pixel driving electrode 4 (PE) and the data line 6-1*a* (Di+) in comparison with the pixel circuit shown in FIG. 4.

A gate terminal as a read-out control terminal of the transistor Q10 in a pixel circuit in the same pixel line is commonly connected to a selection line RD for a read-out switch. In the case of a normal image displaying mode, a selection control signal to be inputted into the gate terminal of the transistor Q10 through the selection line RD controls the transistors Q10 in whole pixel lines to be OFF state. In the case of a pixel inspection mode, the selection control signal makes the transistor Q10 in a pixel line to be inspected sequentially switch ON. Hereupon, the pixel inspection mode is such a mode that reads out a pixel value of one pixel out from a pixel section in which a plurality of pixels are disposed in matrix onto a data line one by one, and inspects possible defect in each pixel one by one. Consequently, in the pixel inspection mode, an image signal to be written-in is not inputted into the data line, and the pixel section is kept in a read-in mode.

A line selection method in such a pixel inspection mode is realized by a similar configuration to a vertical driver circuit composed of a shift register as the same manner as writing an image signal.

Further, the shift register in the vertical driver circuit for writing an image signal enables to be shared with the line selection method in the above-mentioned pixel inspection mode.

In FIG. 6, a pixel circuit 81 is provided with n-lines in the vertical direction and provided with m-rows in the horizontal direction although not sown in FIG. 6. Each of the pixel circuits 81 is the same configuration as that shown in FIG. 5. The gate line 8-1 and a selection line RD1 for a reading-out switch are commonly connected to “m” pieces of pixel circuits 81 in the first line.

Further, a gate line 8-*n* and a selection line RDn for a reading-out switch are commonly connected to “m” pieces of pixel circuits 81 in the n-th line.

Furthermore, in the case of “m” pieces of pixel circuits 81 in an i-th line although the pixel circuit 81 in the i-th line is not shown in FIG. 6, a gate line 8-*i* and a selection line RDi for a reading-out switch are commonly connected to the “m” pieces of pixel circuits 81 in the i-th line as same manner as the other lines.

More, a positive image signal applied to an input terminal “Video (+)” is supplied to each of the plurality of pixels 81 through horizontal sampling switches (S1-1*a*)-(S1-2*a*) and the data lines 6-1*a* and 6-2*a* respectively.

Moreover, a negative image signal applied to an input terminal “Video (−)” is supplied to each of the plurality of pixels 81 through horizontal sampling switches (S1-1*b*)-(S1-2*b*) and the data lines 6-1*ba* and 6-2*b* respectively.

An AND circuit (hereinafter referred to as AND gate) AND1-1 conducts the logical AND operation with respect to a selection control signal from a control terminal WT/RD and a vertical driving signal from an output terminal in the first line of the vertical driver circuit 20, and then outputs the logically AND operated signal to the gate line 8-1.

Further, an AND gate AND1-2 conducts the logical AND operation with respect to a logically inverted selection control signal from the control terminal WT/RD through an inverter INV and the vertical driving signal from the output terminal in the first line of the vertical driver circuit 20, and then outputs the logically AND operated signal to the selection line RD1 for a reading-out switch.

Furthermore, an AND gate ANDn−1 conducts the logical AND operation with respect to the selection control signal from the control terminal WT/RD and a vertical driving signal from an output terminal in the n-th line of the vertical driver circuit 20, and then outputs the logically AND operated signal to the gate line 8-*n*.

More, an AND gate ANDn−2 conducts the logical AND operation with respect to the logically inverted selection control signal from the control terminal WT/RD through the inverter INV and a vertical driving signal from an output terminal in the n-th line of the vertical driver circuit 20, and then outputs the logically AND operated signal to the selection line RDn for a reading-out switch.

In the case of each pixel circuit in an i-th pixel line although the i-th pixel line is not shown in FIG. 6, similarly to the other pixel lines, each pixel circuit in the i-th pixel line is connected to an AND gate, which conducts the logical AND operation with respect to the selection control signal from the control terminal WT/RD and a vertical driving signal from an output terminal in the i-th line of the vertical driver circuit 20, and outputs the logically AND operated signal to the gate line 8-*i*.

Further, each pixel circuit in the i-th line is connected to another AND gate, which conducts the logical AND operation with respect to the logically inverted selection control signal from the control terminal WT/RD through the inverter INV and a vertical driving signal from an output terminal in the i-th line of the vertical driver circuit 20, and then outputs the logically AND operated signal to the selection line RDi for a reading-out switch.

Furthermore, the selection lines RD1-RDn are connected to the gate terminal of the transistor Q10 shown in FIG. 5 of the pixel circuit 81 in the same pixel line.

More, the control terminal WT/RD is supplied with a selection control signal in a high level in the normal image display mode or the pixel writing mode. In the case of the pixel inspection mode or the image reading mode, the control terminal WT/RD is supplied with a selection control signal in a low level.

Moreover, by the gate function of the plurality of AND gates (AND1-1)-(AND1-2) through (ANDn−1)-(ANDn−2) connected to the output terminals of the vertical driver circuit 20 respectively, a selection pulse is sequentially outputted to the plurality of gate lines 8-1 through 8-*n* in the normal image display mode.

On the other hand, in the pixel inspection mode, by the gate function of the plurality of AND gates (AND1-1)-(AND1-2) through (ANDn−1)-(ANDn−2), a selection pulse is sequentially outputted to the plurality of the selection lines RD1 through RDn (hereinafter generically referred to as selection line RD) for reading-out switches. Consequently, by a selection control signal inputted through the control terminal WT/RD, a mode enables to be changed with sharing the vertical driver circuit 20.

In the above-mentioned pixel inspection mode, the transistor Q10 shown in FIG. 5, which is disposed in a pixel circuit within a selected pixel line, is switched ON by the selection pulse that is applied to the gate terminal of the transistor Q10 through the selection line RD for a read-out switch. When the transistor Q10 is switched ON, the connection between the pixel driving electrode 4 and the data line 6-1*a* is made to be conductive, and then a pixel driving electrode voltage is outputted to the data line. At this time, in case a buffer amplifier of a pixel circuit within a selected pixel line in the pixel inspection mode is made to be active and either one of the polarity switching control switch Q5 and Q6 is turned ON, the pixel driving electrode 4 is driven by a buffer output during the period, and a driving voltage applied to the pixel driving electrode 4 enables to be read out toward the data line 6-1*a* side as a voltage output.

By driving the horizontal driver circuit 10 shown in FIG. 5, the pixel driving electrode voltage that is read out toward the data line side is outputted to an image data common input terminal as a time sequence signal through a horizontal sampling switch, wherein the image data common input terminal corresponds to "Video (+)" in FIG. 6. Detecting the time sequence signal enables to inspect the pixel circuit, wherein inspecting the pixel circuit is referred to as detecting pixel defect.

Further, by reading out after writing a same signal into whole pixels within a pixel line to be inspected, and then by detecting fluctuation of the signals read out in the image data common input terminal side, characteristic variation of a buffer amplifier in each pixel enables to be detected. Based on the information about fluctuation of the read-out voltage, composing compensation data of characteristic variation of pixels and compensating an input image signal enables to compensate characteristic variation of pixels, and then enables to obtain a uniform display characteristic.

Further, it is necessary for individually detecting and measuring characteristic of each buffer amplifier in the positive and negative sides to inspect and to measure while switching the polarity switching transistors Q5 and Q6.

In the case of a conventional active matrix liquid crystal display apparatus, the apparatus is such a system that a pixel is driven by a voltage, which is held in a holding capacitor as electric charge. Consequently, pixel reading-out inspection requires a detection amplifier in higher accuracy for detecting minute current change while electric charge moves.

On the contrary, in the case of a combination of the pixel circuit and methods of inspecting and reading-out according to the third embodiment of the present invention, it is configured to read out a voltage itself of a pixel driving electrode, that is, a voltage itself of a pixel driving electrode, which is driven by low output impedance through an output of a buffer amplifier. Consequently, detecting a defective pixel and detecting a pixel characteristic enables to be conducted easier.

Figure 8:
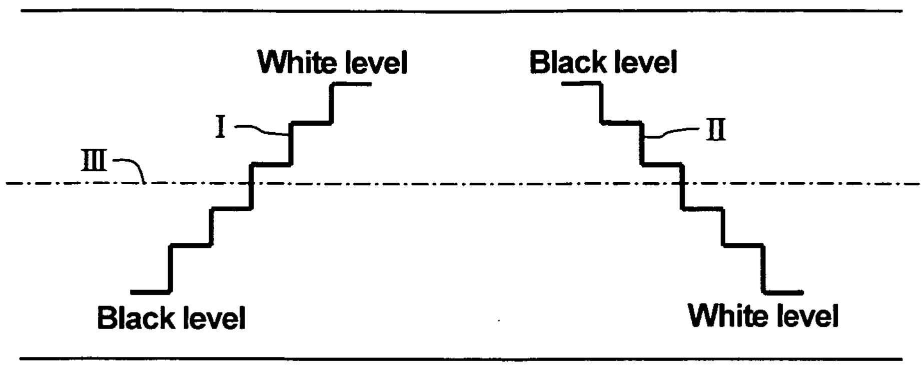
FIG. 8 is a drawing exhibiting relation between a black level and a white level of positive and negative polarity image signals to be written in a pixel the liquid crystal display apparatus according to an embodiment of the present invention.

In reference to FIGS. 7 and 8, description is given to an AC driving control method of the liquid crystal display apparatus according to each embodiment of the present invention next.

FIG. 7(*a*) is a waveform of a vertical sync signal VD.

FIG. 7(*b*) is a waveform of a load characteristic control signal on the line B applied to the transistors Q7 and Q8 in the pixel circuit shown in FIGS. 3 and 4, wherein the transistors Q7 and Q8 are the constant current load of the source follower buffer circuit in the pixel circuit as mentioned above.

FIG. 7(*c*) is a waveform of a gate control signal on the line S+ applied to the gate terminal of the switching transistor Q5 for transferring a positive driving voltage in the pixel circuit shown in FIGS. 3 and 4.

FIG. 7(*d*) is a waveform of a gate control signal on the line S− applied to the gate terminal of the switching transistor Q6 for transferring a negative driving voltage in the pixel circuit shown in FIGS. 3 and 4.

FIG. 7(*e*) is a waveform of a driving voltage VPE applied to the pixel driving electrode PE of a pixel element shown in FIGS. 3 and 4.

FIG. 7(*f*) is a waveform of a voltage Vcom applied to the common electrode CE shown in FIGS. 3 and 4.

FIG. 7(*g*) is a waveform of an AC voltage VLC excluding a DC component applied to the Liquid crystal layer LCM shown in FIGS. 3 and 4.

FIG. 8 is a level chart showing a relation of a level from black to white of a positive image signal "I" and a negative image signal "II" respectively with respect to a center axis "III" of reverse. In FIG. 8, a minimum level of the positive image signal "I" is a black level and a maximum level is a white level. On the contrary, in the case of the negative image signal "II", a minimum level is the white level and a maximum level is the black level.

As mentioned above, in FIG. 8, the minimum level of the positive image signal "I" shows the black level and the maximum level exhibits the white level, and the minimum level of the negative image signal "II" exhibits the white level and the maximum level shows the black level. However, it is acceptable that the minimum level of the positive image signal "I" is the white level and the maximum level is the black level, and the minimum level of the negative image signal "II" is the black level and the maximum level is the white level.

In the pixel circuit shown in FIG. 3 or 4, the positive switching transistor Q5 is switched ON while a gate control signal of the line S+ shown in FIG. 7(*c*) is in a high level. During the ON period, a load characteristic control signal applied to the line B is in a high level as shown in FIG. 7(*b*), the source follower buffer circuit is made to be active, and then the node of the pixel driving electrode PE is charged up to a positive image signal level. In case a load characteristic control signal on the line B is made to be a low level and the gate control signal on the line S+ is also made to be in a low level when the pixel driving electrode PE is fully charged, the pixel driving electrode PE is made floating and a positive driving voltage is held in a capacitor of a liquid crystal display element.

On the other hand, the negative switching transistor Q6 is switched ON while a gate control signal of the line S− shown in FIG. 7(*d*) is in a high level. During the high level period of the gate control signal, a load characteristic control signal applied to the line B is in a high level as shown in FIG. 7(*b*), the source follower buffer circuit is made to be active, and then the node of the pixel driving electrode PE is charged up to a negative image signal level. In case a load characteristic control signal on the line B is made to be a low level and the gate control signal on the line S− is also made to be in a low level when the pixel driving electrode PE is fully charged, the pixel driving electrode PE is made floating and a negative driving voltage is held in a capacitor of the liquid crystal display element.

Succeedingly, by repeating such an operation as the constant current load transistor Q7, Q8 or Q9 is made to be intermittently active in synchronism with the switching operation of making the switching transistors Q5 and Q6 alternately ON, the driving voltage VPE shown in FIG. 7(*e*), which is made to be AC by positive and negative image signals, is applied to the pixel driving electrode PE of the pixel element.

According to the embodiment of the present invention, stored electric charge is supplied to a pixel driving section through the source follower buffer circuit as a voltage instead of transmitting the stored electric charge directly to the pixel driving section. Therefore, it is not necessary to neutralize electric charge even though the electric charge is repeatedly charged and discharged in positive and negative polarities.

Accordingly, a driving method without attenuation of voltage level enables to be realized even though a polarity is switched a plurality of times.

Further, a substantial AC driving voltage of the Liquid crystal layer LCM is a differential voltage between the voltage Vcom shown in FIG. 7(*f*) applied to the common electrode CE and the voltage VPE applied to the pixel driving electrode PE. As shown in FIG. 7(*f*), the voltage Vcom applied to the common electrode CE is reversed in synchronism with switching a pixel polarity with respect to a reference level being almost equivalent to a reversing reference level of a voltage of the pixel driving electrode PE. By the AC driving control method, an absolute value of voltage difference between the voltage Vcom applied to the common electrode CE and the voltage VPE applied to the pixel driving electrode PE is always constant, and then the voltage VLC excluding a DC component shown in FIG. 7(*g*) is applied to the Liquid crystal layer LCM. The voltage Vcom to be applied to the common electrode CE is outputted through the controller 60 shown in FIG. 2.

As mentioned above, by switching the voltage Vcom of the common electrode CE in a reverse phase with respect to the voltage VPE applied to the pixel driving electrode PE, amplitude of a driving voltage in a pixel side, that is, amplitude of a driving voltage in the pixel driving electrode PE side can be reduced to almost a half. A necessary endurance voltage of a transistor constituting the pixel circuit and a peripheral scanning circuit enables to be drastically reduced by the liquid crystal display apparatus according to the embodiment of the present invention. Consequently, a special configuration for high endurance voltage or applying a special process is not necessary for a transistor, and resulting in reducing device cost.

Further, as mentioned above, a driving section such as the pixel circuit of the liquid crystal display apparatus according to the first to third embodiments of the present invention enables to be constituted by a transistor in a low endurance voltage and in a small size. Consequently, it enables to realize a liquid crystal display apparatus that is higher in pixel density.

Furthermore, a transistor, which is high in driving ability per unit channel width, enables to be adopted due to reduction of an endurance voltage of a transistor, so that the liquid crystal display apparatus according to the present invention enables to allow easier application for driving operation in higher speed.

More, by conducting the load characteristic control signal on the line B to be a pulse array as shown in FIG. 7(*b*), the pixel circuit according to each embodiment of the present invention controls the constant current load transistors Q7 and Q8 in FIG. 3 in the source follower buffer circuit so as to be active during a limited period of time in the conductive period of the switching transistors Q5 and Q6 in FIG. 3 instead of making the transistors Q7 and Q8 always active because reducing electric current consumption of the liquid crystal display apparatus is considered. For instance, although stationary current of a source follower buffer circuit per one pixel circuit is minute current of 1 μA at most, total electric current consumption of a liquid crystal display apparatus becomes extremely large as long as whole pixels in the apparatus constantly consume electric current. In the case of a liquid crystal display apparatus capable of displaying 200 million pixels of the full high vision system, its electric current consumption reaches 2 A.

Accordingly, as shown in FIGS. 7(*a*)-7(*d*), the liquid crystal display apparatus according to the embodiment of the present invention controls to limit a driving period of the transistors Q7 and Q8 of the source follower buffer circuit by making the load characteristic control signal supplied through the line B to be in a high level within the conductive period of the transistors Q5 and Q6 while the gate control signals supplied through the lines S+ and S− are in a high level. By the AC driving control method according to the present invention, immediately after the driving voltage VPE of the liquid crystal element is charged and discharged up to an objective level as shown in FIG. 7(*e*), the load characteristic control signal is instantaneously shifted to a low level and the transistors Q7 and Q8 are switched OFF, and then electric current of the source follower buffer circuit is interrupted. Consequently, the liquid crystal display apparatus according to the embodiment of the present invention enables to suppress substantial electric current consumption even though the apparatus is provided with a buffer amplifier in each pixel.

Fourth Embodiment

Figure 9:
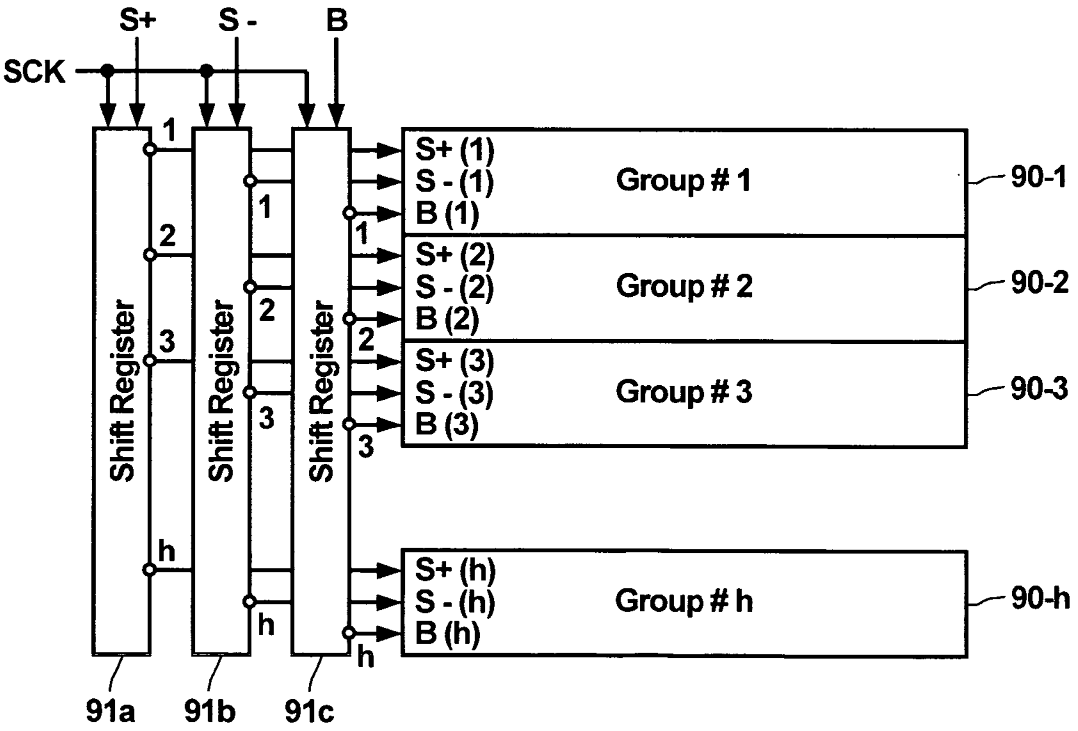
FIG. 9 is a constitutional drawing of a major part of the liquid crystal display apparatus according to a fourth embodiment of the present invention.
Figure 10M:
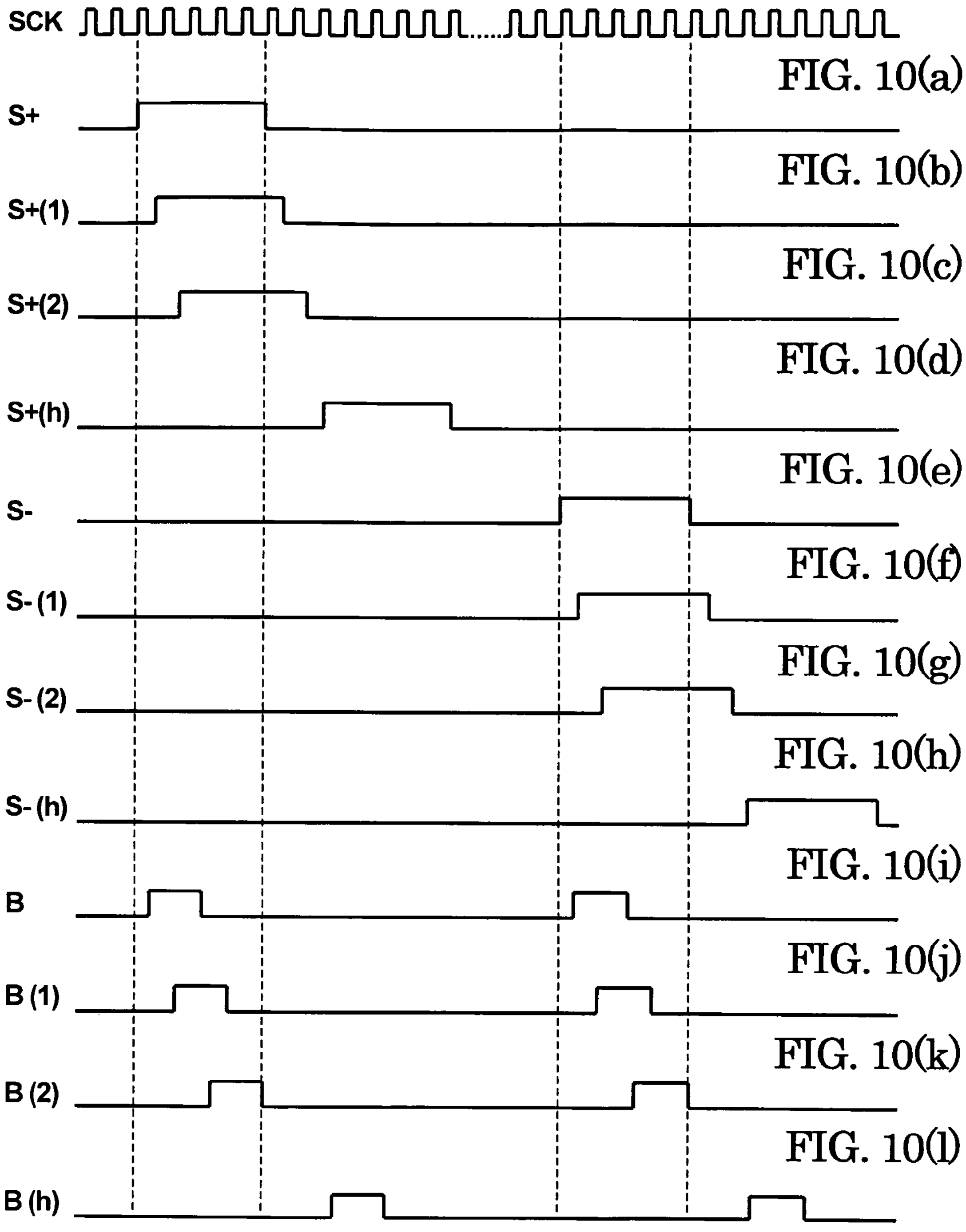
FIGS. 10(*a*)-10(*m*) are timing charts of signals at each section shown in FIG. 9.

In reference to FIGS. 9 and 10, a control method of the source follower buffer circuit according to a fourth embodiment of the present invention is described n detail next.

FIG. 9 is a constitutional drawing of a major part of a liquid crystal display apparatus according to the fourth embodiment of the present invention.

FIG. 10(*a*) is a waveform of shift clock signal SCK to be supplied to a shift register shown in FIG. 9.

FIG. 10(*b*) is a waveform of a gate control signal supplied to a line S+ shown in FIG. 9.

FIG. 10(*c*) is a waveform of a gate control signal supplied to an input terminal S+(1) of group #1 of a divided pixel section shown in FIG. 9.

FIG. 10(*d*) is a waveform of a gate control signal supplied to an input terminal S+(2) of group #2 of a divided pixel section shown in FIG. 9.

FIG. 10(*e*) is a waveform of a gate control signal supplied to an input terminal S+(h) of group #h of a divided pixel section shown in FIG. 9.

FIG. 10(*f*) is a waveform of a gate control signal supplied to a line S− shown in FIG. 9.

FIG. 10(*g*) is a waveform of a gate control signal supplied to an input terminal S− (1) of group #1 of a divided pixel section shown in FIG. 9.

FIG. 10(*h*) is a waveform of a gate control signal supplied to an input terminal S− (2) of group #2 of a divided pixel section shown in FIG. 9.

FIG. 10(*i*) is a waveform of a gate control signal supplied to an input terminal S− (h) of group #h of a divided pixel section shown in FIG. 9.

FIG. 10(*j*) is a waveform of a load characteristic control signal supplied to a line B shown in FIG. 9.

FIG. 10(*k*) is a waveform of a load characteristic control signal supplied to an input terminal B (1) of the group #1 of the divided pixel section shown in FIG. 9.

FIG. 10(*l*) is a waveform of a load characteristic control signal supplied to an input terminal B (2) of the group #2 of the divided pixel section shown in FIG. 9.

FIG. 10(*m*) is a waveform of a load characteristic control signal supplied to an input terminal B (h) of the group #h of the divided pixel section shown in FIG. 9.

The AC driving control method of the pixel circuit explained in reference to FIGS. 7(*a*)-7(*g*) is described on the intermittent active control of the source follower buffer circuit so as not to flow stationary electric current through the source follower buffer circuit. However, in the case of a liquid crystal display apparatus according to the fourth embodiment of the present invention, it is characterized in that another control device is provided for preventing whole pixels from being switched ON simultaneously.

The liquid crystal display apparatus according to the fourth embodiment of the present invention realizes both of polarity reversing control and active control of a source follower buffer circuit so as to maintain time difference in the vertical direction of a screen. As shown in FIG. 9, the liquid crystal display apparatus according to the fourth embodiment of the present invention is composed of a plurality of divided pixel sections "90-1"-"90-*h*" and three shift registers 91*a*, 91*b* and 91 having "h" stages respectively. The plurality of divided pixel sections "90-1"-"90-*h*" is equivalent to the pixel section 30 in FIG. 2 that is divided into "h" blocks in the vertical direction, where "h" is a natural number of more than 2 including 2. The shift registers 91*a*-91*c* shift a gate control signal for switching polarity of a line S+, another gate control signal for switching polarity of a line S− and a load characteristic control signal supplied to a line B respectively in synchronism with a shift clock signal SCK.

Further, the shift registers 91*a*-91*c* correspond to the vertical driver circuit 20 in FIG. 2.

In addition, FIG. 9 exhibits only circuit sections necessary for active controlling the source follower buffer circuit, so that other sections such as the horizontal driver circuit 10 shown in FIG. 2 are omitted.

Each of the plurality of divided pixel sections "90-1"-"90-*h*" is the divided pixel section, which combines a plurality of lines of pixels in one group such as group #1-group #h. The shift register 91*a* supplies the gate control signal of the line S+ to each of input terminals "S+(1)"-"S+(h)" of the plurality of divided pixel sections "90-1"-"90-*h*" through each of output terminals "1" through "h" stages of the shift register 91*a*.

Further, the shift register 91*b* supplies the gate control signal of the line S− to each of input terminals "S− (1)"-"S− (h)" of the plurality of divided pixel sections "90-1"-"90-*h*" through each of output terminals "1" through "h" stages of the shift register 91*b*.

Furthermore, the shift register 91*c* supplies the load characteristic control signal of the line B to each of input terminals "B (1)"-"B (h)" of the plurality of divided pixel sections "90-1"-"90-*h*" through each of output terminals "1" through "h" stages of the shift register 91*c*.

In addition thereto, the shift register 91*a* shifts the gate control signal of the line S+ shown in FIG. 10(*b*) in synchronism with the shift clock signal SCK shown in FIG. 10(*a*) and supplies the shifted gate control signals shown in FIGS. 10(*c*)-10(*e*) respectively to each of the input terminals "S+(1)"-"S+(h)" of the plurality of divided pixel sections "90-1"-"90-*h*" through each of the output terminals "1" through "h" stages of the shift register 91*a*.

Similarly, the shift register 91*b* shifts the other gate control signal of the line S− shown in FIG. 10(*f*) in synchronism with the shift clock signal SCK shown in FIG. 10(*a*) and supplies the shifted gate control signals shown in FIGS. 10(*g*)-10(*i*) respectively to each of the input terminals "S− (1)"-"S− (h)" of the plurality of divided pixel sections "90-1"-"90-*h*" through each of the output terminals "1" through "h" stages of the shift register 91*b*.

Further, the shift register 91*c* shifts the load characteristic control signal of the line B shown in FIG. 10(*j*) in synchronism with the shift clock signal SCK shown in FIG. 10(*a*) and supplies the shifted load characteristic control signals shown in FIGS. 10(*k*)-10(*m*) respectively to each of the input terminals "B (1)"-"B (h)" of the plurality of divided pixel sections "90-1"-"90-*h*" through each of the output terminals "1" through "h" stages of the shift register 91*c*.

According to the liquid crystal display apparatus of the fourth embodiment of the present invention, the liquid crystal display apparatus enables to realize polarity reversing and active control of the buffer maintaining time difference, so that an electric current value is dispersed in time base and averaged. Consequently, erratic operation or failure can be avoided. In order to eliminate affection of the time difference of controlling to a displaying characteristic, it is the base way that a frequency of the shift clock signal SCK is selected in an extremely high frequency with respect to a frequency of reversing polarity.

Fifth Embodiment

In reference to FIGS. 11(*a*1)-11(*e*2) and 12, optimizing mutual timing control for switching polarity of the pixel driving electrode and the common electrode according to a fifth embodiment of the present invention is described in detail next.

FIGS. 11(*a*1)-11(*e*1) exhibit timing chart when timing of switching polarity of the pixel driving electrode precedes firing of switching polarity of the common electrode.

FIGS. 11(*a*2)-11(*e*2) exhibit timing chart when timing of switching polarity of the common electrode precedes timing of switching polarity of the pixel driving electrode.

More specifically, FIGS. 11(*a*1) and 11(*a*2) are waveforms of a voltage Vcom to be applied to the common electrode CE of a liquid crystal element, FIGS. 11(*b*1) and 11(*b*2) are waveforms of a gate control signal of the line S+ applied to the gate terminal of the switching transistor Q5 for transferring the positive driving voltage in the pixel circuit shown in FIG. 3, FIGS. 11(*c*1) and 11(*c*2) are waveforms of a gate control signal of the line S− applied to the gate terminal of the switching transistor Q6 for transferring the negative driving voltage in the pixel circuit shown in FIG. 3, FIGS. 11(*d*1) and 11(*d*2) are waveform of the load characteristic control signal of the line B to be applied to the gate terminals of the transistors Q7 and Q8 shown in FIG. 3, and FIGS. 11(*e*1) and 11(*e*2) are waveform of the driving voltage VPE to be applied to the pixel driving electrode PE of the liquid crystal element.

Figure 12:
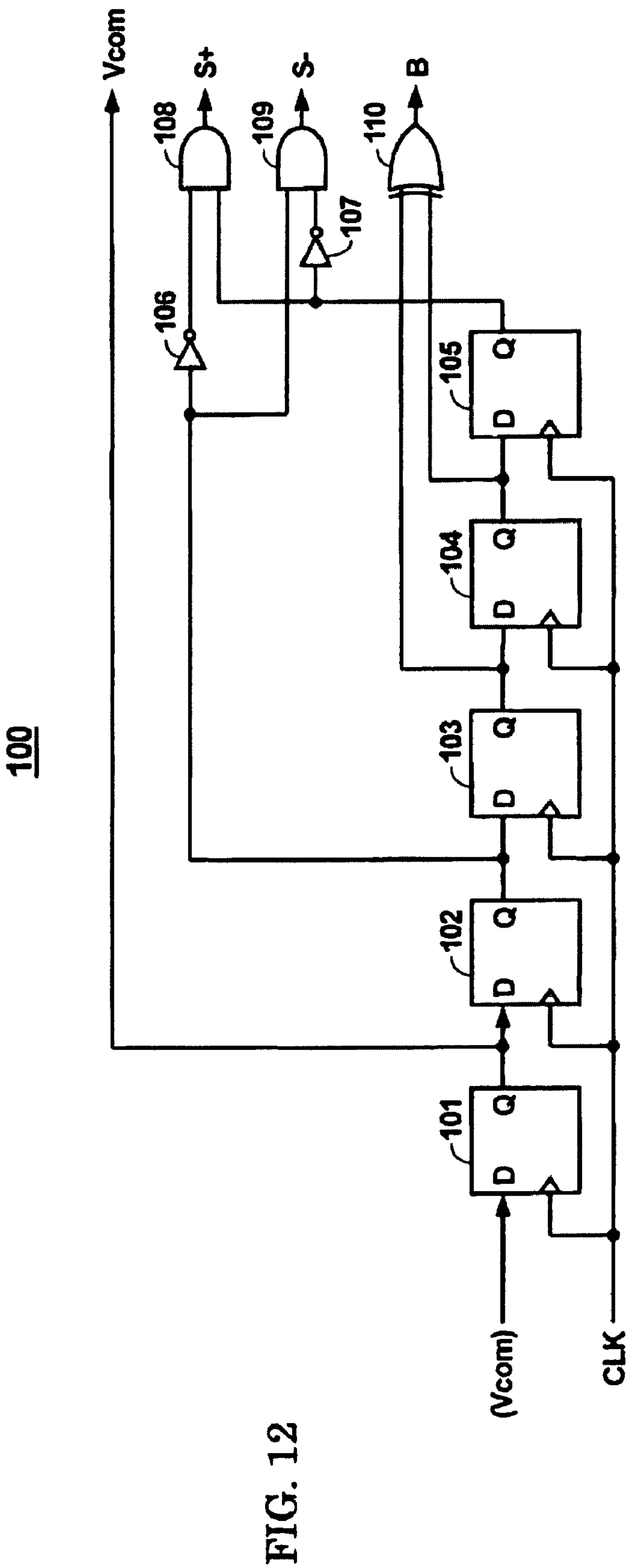
FIG. 12 is a block diagram of a timing generator circuit for realizing timing control shown in FIGS. 11(*a*1)-11(*e*2) according to the fifth embodiment of the present invention.

FIG. 12 is a block diagram of a timing generator circuit for realizing timing control shown in FIGS. 11(*a*1)-11(*e*2) according to the fifth embodiment of the present invention.

First of all, description is given to such a case that a positive switching transistor is switched ON when a gate control signal of the line S+ is in a high level during a period from time t1 to time t2 as shown in FIG. 11(*b*1) before polarity of the common electrode voltage Vcom is switched at time t3 as shown in FIG. 11(*a*1). In this case, when a load characteristic control signal of the line B to be supplied to a gate terminal of a constant current load transistor of a source follower circuit in a pixel circuit is switched to a high level as shown in FIG. 11(*d*1) during the period from the time t1 to the time t2 while the positive switching transistor is in the ON state, a positive source follower buffer circuit and a switching transistor such as Q5 in FIG. 3 are made to be active, and then a pixel driving electrode such as PE in FIG. 3 of a pixel element is applied with a positive driving voltage corresponding to an image signal.

When the positive driving voltage is transmitted to the pixel driving electrode PE and then the pixel driving electrode voltage VPE reaches to a specific positive voltage as shown in FIG. 11(*e*1), the load characteristic control signal of the line B is made to be a low level as shown in FIG. 11(*d*1), and then the positive source follower buffer circuit is made to be non-active.

Succeedingly, when the gate control signal of the line S+ is made to be a low level at the time t2, the positive switching transistor is switched OFF, and then a node of the pixel driving electrode PE of the liquid crystal element is shifted to a floating state. However, as shown in FIG. 11(*e*1), the pixel driving electrode voltage VPE is continuously held in a certain positive voltage after the time t2 due to parasitic capacitance of the node of the pixel driving electrode PE.

Secondary, as shown in FIG. 11(*a*1), polarity of the common electrode voltage Vcom is reversed from a positive holding voltage of pixel driving electrode to a negative holding voltage at the time t3. At the moment, since coupling of capacitance caused by an Liquid crystal layer such as LCM in FIG. 3 formed between the common electrode and the pixel driving electrode exists, the pixel driving electrode voltage VPE that is held in the floating state fluctuates by ΔVp as shown in FIG. 11(*e*1) due to affection of reversing the common electrode voltage Vcom at the time t3.

Similarly, even in a sequence from time t4 to time t6 in which polarity of the pixel driving electrode voltage Vcom is switched from negative to positive, the pixel driving electrode voltage VPE fluctuates by ΔVm as shown in FIG. 11(*e*1) due to affection of reversing the common electrode voltage Vcom at the time t6 by the existing coupling of capacitance caused by the Liquid crystal layer formed between the common electrode and the pixel driving electrode.

As mentioned above, in the control timing shown in FIGS. 11(*a*1)-11(*e*1), since the voltage fluctuation of ΔVp and ΔVm occurs at the timing after the polarity of the pixel driving electrode voltage VPE is switched due to the coupling of capacitance caused by the Liquid crystal layer, the pixel driving electrode voltage VPE is shifted from the specific voltage corresponding to an original image signal by ΔVp or ΔVm. The difference of voltage acts on AC amplitude of the pixel driving electrode voltage VPE to shrink, so that effective voltage applied on a liquid crystal is reduced by the difference of voltage.

On the other hand, in the case of the timing control method shown in FIGS. 11(*a*2)-11(*e*2), the difference of voltage is improved by controlling the timing of switching polarity of the common electrode voltage Vcom so as to precede the timing of switching polarity of the pixel driving electrode voltage VPE.

As shown in FIG. 11(*a*2), polarity of a common electrode voltage Vcom is switched from positive to negative at time t7. Succeedingly, a gate control signal of the line S+ is made to be a high level as shown in FIG. 11(*b*2) during a period from time t8 to time t9 after the polarity of the common electrode voltage Vcom has been switched from positive to negative, and then a positive switching transistor is switched ON.

Further, during the ON period of the switching transistor, as shown in FIG. 11(*d*2), a load characteristic control signal of the line B is made to be a high level and a positive source follower buffer circuit and a switching transistor such as Q5 in FIG. 3 is made to be active, and then a positive driving voltage corresponding to an image signal is applied to a pixel driving electrode such as PE in FIG. 3 of a liquid crystal element. Consequently, the positive driving voltage is transmitted to the pixel driving electrode PE.

Hereupon, as shown in FIG. 11(*e*2), the voltage fluctuation ΔVm is generated on the pixel driving electrode voltage VPE at the time t7 due to the above-mentioned coupling of capacitance caused by the Liquid crystal layer formed between the common electrode and the pixel driving electrode. However, during the ON period between the time t8 and the time t9 of the positive switching transistor, changing polarity of the pixel driving electrode is conducted, and then the pixel driving electrode voltage VPE is switched to the specific positive voltage corresponding to the original image signal that is not affected by the voltage fluctuation during the ON period from the time t8 to the time t9 as shown in FIG. 11(*e*2).

Similarly to the control operation of switching the positive polarity to the negative polarity at the time t7, as shown in FIG. 11(*a*2), polarity of the common electrode voltage Vcom is switched from negative to positive at time t10.

Succeedingly, as shown in FIGS. 11(*c*2) and 11(*d*2), the gate control signal of the line S− and the load characteristic control signal of the line B are respectively made to be a high level during a period from time t11 to time t12 after the polarity of the common electrode voltage Vcom has been switched from negative to positive. Then, the negative source follower buffer circuit and the switching transistor such as Q5 in FIG. 3 are made to be active.

Accordingly, as shown in FIG. 11(*e*2), the voltage fluctuation ΔVp occurs on the pixel driving electrode voltage VPE at the time t10 as the same manner as mentioned above. However, switching polarity of the pixel driving electrode is conducted during the period from the time t11 to the time t12 immediately after the time t10, and then the pixel driving electrode voltage VPE is switched to a specific negative voltage corresponding to the original image signal, which is not affected by the voltage fluctuation.

As it is apparent from the above-mentioned descriptions with reference to FIGS. 11(*a*1)-11(*e*2), in the case of the timing control method shown in FIGS. 11 (a2)-11 (e2), by controlling the timing of switching polarity of the common electrode voltage Vcom so as to precede the timing of switching polarity of the pixel driving electrode voltage VPE, affection of the fluctuation of the pixel driving electrode voltage is limited within a short period of time equivalent to a bit of time difference from the timing of switching polarity of the common electrode voltage Vcom to the timing of switching polarity of the pixel driving electrode voltage VPE even though the pixel driving electrode voltage that is in a floating state by the coupling of capacitance caused by the Liquid crystal layer fluctuates. With respect to almost all period other than the short period of time, a pixel driving electrode voltage enables to be maintained at an original driving voltage corresponding to the original image signal.

As shown in FIG. 12, a timing generator circuit 100 is composed of five D-type flip-flops (hereinafter referred to as D-FF) 101-105 that are connected in cascade, two inverters 106 and 107, two AND gates 108 and 109 having two input terminals respectively and an exclusive OR circuit (hereinafter referred to as EX-OR gate) 110. The inverter 106 inverts a "Q" output signal from the D-FF 102 disposed in the second stage of the cascaded flip-flops. The inverter 107 inverts a "Q" output signal from the D-FF 105 disposed in the fifth stage of the cascaded flip-flops. The EX-OR gate 110 conducts the exclusive OR operation with respect to "Q" output signals from the D-FFs 103 and 104.

Further, each of the D-FFs 101-105 is the one-bit latch circuit and reference clock signal CLK having a frequency equivalent to a time unit of the timing control method according to the fifth embodiment of the present invention is commonly inputted into each of clock terminals of the D-FFs 101-105.

Furthermore, the five D-FFs 101-105 disposed in the cascade connection constitute a shift register. A control timing pulse of which frequency accords to a frequency of switching polarity of the common electrode voltage Vcom is inputted into a data input terminal "D" of the D-FF 101 in the first stage. The control timing pulse is sequentially outputted to each of the "Q" output terminals a-e of the D-FFs 101-105 respectively with being delayed by one clock time unit.

In the case of the timing generator circuit 100 according to the fifth embodiment of the present invention, switching polarity of the common electrode voltage Vcom is controlled so as to precede switching polarity of the pixel driving electrode voltage VPE as mentioned above in reference to FIGS. 11(*a*2)-11(*e*2). Consequently, an output from the "Q" output terminal (hereinafter referred to as "Q" output signal) of the D-FF 101 in the first stage is designated as a common electrode voltage Vcom.

Further, a signal that is logically inverted "Q" output signal from the D-FF 102 by the inverter 106 and a "Q" output signal from the D-FF 105 are processed through the logical AND operation by the AND gate 108. The logically AND operated signal is designated as a gate control signal to be transmitted through the line S+ (hereinafter referred to as positive switch control signal in some cases).

Furthermore, the "Q" output signal from the D-FF 102 and a signal that is logically inverted "Q" output signal from the D-FF 105 by the inverter 107 are logically AND operated by the AND gate 109. The logically AND operated signal is designated as a gate control signal to be transmitted through the line S-(hereinafter referred to as negative switch control signal in some cases).

More, the EX-OR gate 110 conducts the exclusive OR operation to a "Q" output signal from the D-FF 103 and another "Q" output signal from the D-FF 104, and resulting in producing a load characteristic control signal of the line B that makes a constant current load transistor of a source follower buffer circuit in a pixel circuit to be active.

Controlling the constant current load transistor of the source follower buffer circuit in the pixel circuit so as to be shifted from ON to OFF is necessary to be completed within a period while a switch for switching pixel polarity maintains a ON state. Consequently, OFF timing of the constant current load transistor is produced from the "Q" output signal from the D-FF 104 and OFF timing of the switch for switching pixel polarity is produced from the "Q" output signal from the D-FF 105.

As mentioned above, in the timing generator circuit 100, controlling the common electrode, a pixel switch and a pixel buffer load can be definitely realized in synchronism with the frequency of the reference clock signal CSK with maintaining relation of prescribed timing among them.

Further, the timing generator circuit 100 according to the fifth embodiment of the present invention produces the timing by shifting each control timing by one clock in synchronism with the period of the reference clock signal CLK. However, it is also possible to conduct a control method having time difference among a plurality of clock frequencies.

Furthermore, in the timing generator circuit 100, an original input signal is a common electrode control signal. By delaying the common electrode control signal, a desired timing control signal is produced.

More, a timing generator circuit is not limited to the circuit configuration shown in FIG. 12. Any circuit is applicable for the timing generator circuit as long as the fundamentals of the timing control method mentioned above in reference to FIGS. 11(*a*2)-11(*e*2) enables to be realized.

Sixth Embodiment

In reference to FIGS. 13(*a*)-13(*h*) and 14, writing operation of an image signal and timing control of synchronized operation for switching the pixel polarity mentioned above in the liquid crystal display apparatus according to a sixth embodiment of the present invention is described in detail next.

Figures 13A, 13B, 13C, 13D, 13E, 13F, 13G, 13H:
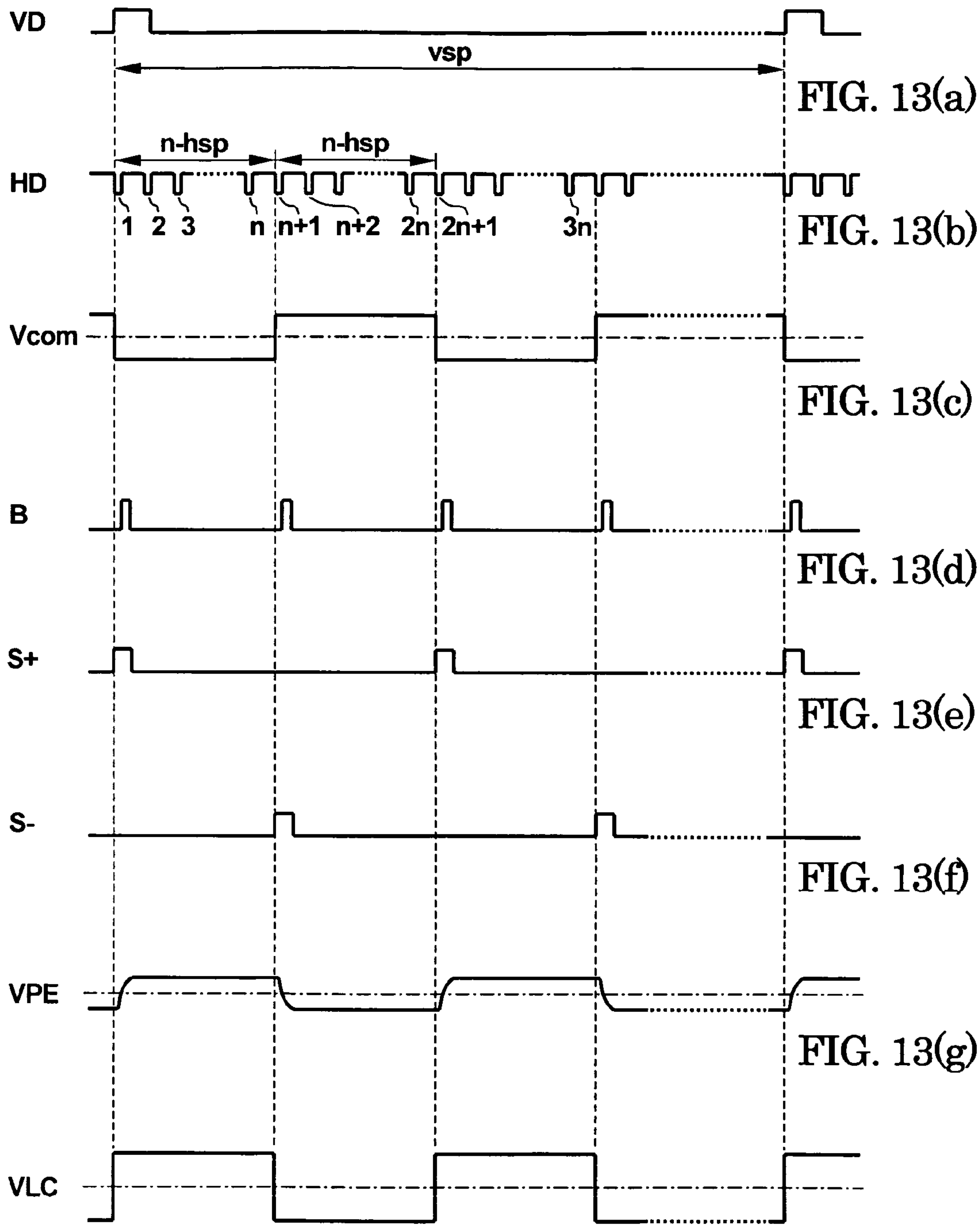
FIGS. 13(*a*)-13(*h*) are timing charts exhibiting timing control of synchronizing operation between writing an image signal and switching polarity of a pixel in the liquid crystal display apparatus according to a sixth embodiment of the present invention.

FIG. 13(*a*) is a waveform of a vertical sync signal VD to be supplied to a liquid crystal display apparatus corresponding to a vertical scanning period of an image signal.

FIG. 13(*b*) is a waveform of horizontal sync signal HD corresponding to a horizontal scanning period.

FIG. 13(*c*) is a waveform of a common electrode voltage Vcom.

FIG. 13(*d*) is a waveform of a load characteristic control signal on a line B.

FIG. 13(*e*) is a waveform of a positive switch control signal on a line S+.

FIG. 13(*f*) is a waveform of a negative switch control signal on a line S−.

FIG. 13(*g*) is a waveform of a driving voltage VPE applied to a pixel driving electrode PE of a pixel element.

FIG. 13(*h*) is a waveform of an AC voltage VLC applied to a liquid crystal layer.

In FIGS. 13(*a*)-13(*h*), all waveforms respectively exhibit a signal array in one vertical scanning period "vsp" of an image signal.

Figure 14:
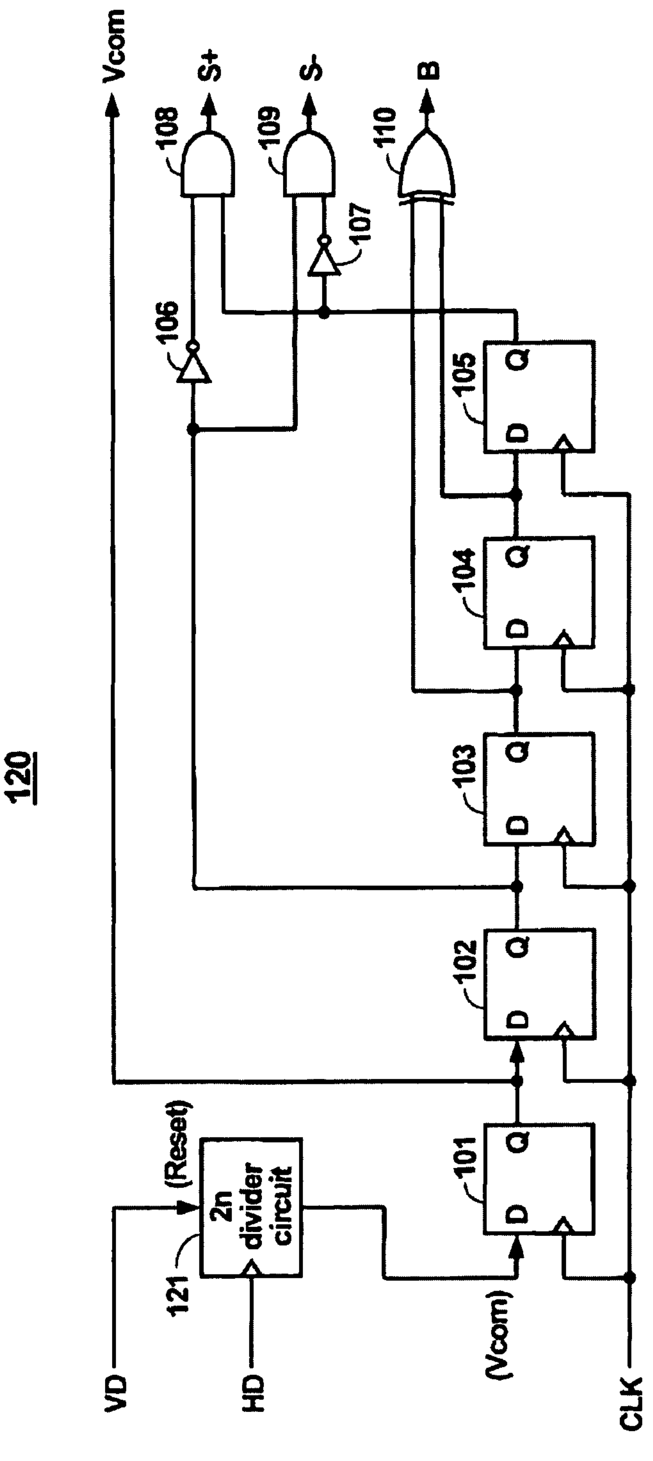
FIG. 14 is a block diagram of a timing control circuit for synchronous control between write-in timing of an image signal and switching timing of polarity of a pixel exhibited in FIGS. 13(*a*)-13(*h*) according to the sixth embodiment of the present invention.

FIG. 14 is a block diagram of a timing control circuit for synchronous control between write-in timing of an image signal and switching timing of polarity of a pixel exhibited in FIGS. 13(*a*)-13(*h*) according to a sixth embodiment of the present invention.

A timing control method according to the sixth embodiment of the present invention is characterized in that timing of switching polarity of a pixel driving voltage or controlling timing of switching polarity of a common electrode voltage and controlling timing of switching polarity of a pixel driving electrode voltage are conducted to be a synchronized controlling method so as to maintain a prescribed phase relation with a period of the vertical sync signal VD or a vertical scanning period and a period of the horizontal sync signal HD or a horizontal scanning period.

In the timing control method according to the sixth embodiment of the present invention, a polarity reversing period is controlled so as to be reversed with respect to each 2n times the horizontal scanning period of image signal. In other words, the polarity reversing period is controlled so as to be reversed with respect to each n-lines of the horizontal scanning period "n-hsp" of the image signal. At the same time, the polarity reversing period is further controlled so as to synchronize with timing of starting the vertical scanning within a prescribed phase. Reversing control of polarity of liquid crystal driving enables to be conducted at arbitrary timing independently of the scanning period of image signal in principal.

However, such an arbitrary timing method actually generates a problem such that each signal condition of a switching period of a common electrode voltage, a positive switch control signal, a negative switch control signal and a load characteristic control signal interferes in a voltage in a write-in side through various parasitic capacitance, and resulting in generating a picture noise, which reflects switching timing of polarity. Particularly, in case scanning timing of an image signal and control timing of switching polarity do not synchronize with each other, their interference generates random nose and the random noise appears on a screen as a noise intermittently flowing on a screen vertically in a beat shape. Consequently, displaying quality is extremely deteriorated.

On the other hand, in the case of the timing control method according to the sixth embodiment of the present invention, as shown in FIGS. 13(*a*)-13(*h*), each polarity switching operation of the load characteristic control signal of the line B shown in FIG. 13(*d*), the positive switch control signal of the line S+ shown in FIG. 13(*e*), the negative switch control signal of the line S− shown in FIG. 13(*f*) respectively synchronize with the vertical sync signal VD shown in FIG. 13(*a*). Consequently, during the n-line horizontal scanning period "n-hsp" from a first line to an n-th line, the AC voltage VLC applied to an liquid crystal layer shown in FIG. 13(*h*) is constantly maintained in positive, wherein the pixel driving electrode voltage VPE shown in FIG. 13(*g*) is also maintained in positive and the common electrode voltage Vcom is maintained in negative.

Further, during a next n-line horizontal scanning period "n-hsp" from an (n+1)-th line to a 2*n*-th line, the AC voltage VLC applied to the Liquid crystal layer shown in FIG. 13(*h*) is constantly maintained in negative, wherein the pixel driving electrode voltage VPE shown in FIG. 13(*g*) and the common electrode voltage Vcom is maintained in negative and positive respectively.

Furthermore, with respect to whole scanning lines, a state of switching polarity at timing for selecting a line to be scanned is set to a prescribed condition.

By synchronizing a scanning period of an image signal with the operation timing of switching polarity as mentioned above, it is possible to improve deterioration of displaying quality resulted from picture noise caused by mutual interference between the switching operation of polarity and the picture scanning operation.

It is illustrated in FIGS. 13(*a*)-13(*h*) that each switching phase of the vertical sync signal VD, the horizontal sync signal HD and the common electrode voltage Vcom, which is a polarity switching basis, is brought in line at the same time for the purpose of easier understanding synchronous relation between the scanning period of an image signal and the operation timing of switching polarity. However, inventive concept of synchronizing mutual timing is not limited to the above-mentioned method.

For instance, it is acceptable that switching the common electrode voltage and phase of switching polarity of the pixel driving electrode voltage is designated in an arbitrary period within a horizontal scanning period such as an effective period of an image signal and a horizontal blanking period of an image signal during the horizontal scanning period of the image signal.

In other words, by the method of synchronizing mutual timing according to the sixth embodiment of the present invention, an arbitrary condition that improve affection of noise caused by interference between the scanning operation of the image signal and the control operation of switching polarity enables to be selected with respect to a relation of mutual phases under a condition of synchronizing a scanning period of an image signal with an operation timing period of switching polarity.

FIG. 14 is a block diagram of a timing control circuit that realizes the method of synchronous control between write-in timing of an image signal, that is, scanning timing in the vertical and horizontal directions and switching timing of polarity of a pixel described in reference to FIGS. 13(*a*)-13(*h*). In FIG. 14, the same component as shown in FIG. 12 is denoted by the same reference sign and its description is omitted.

As shown in FIG. 14, a timing control circuit 120 is composed of a 2n-divider circuit 121, five D-FF 101-105 that are connected in cascade, two inverters 106 and 107, two AND gates 108 and 109 having two input terminals and an EX-OR gate 110. The inverter 106 inverts a "Q" output signal from the D-FF 102 disposed in the second stage of the cascaded flip-flops. The inverter 107 inverts a "Q" output signal from the D-FF 105 disposed in the fifth stage of the cascaded flip-flops. The EX-OR gate 110 conducts the exclusive OR operation with respect to "Q" output signals from the D-FF 103 and 104. As a result, the timing control circuit 120 shown in FIG. 14 is similar to the timing control circuit 100 shown in FIG. 12 except for the 2n-divider circuit 121. In the case of the timing control circuit 120, a signal divided by the 2n-divider 121 is supplied to the data input terminal "D" of the D-FF 101 of the timing control circuit 100 shown in FIG. 12 as a control timing pulse in synchronism with the switching period of the common electrode voltage Vcom.

The 2n-divider circuit 121 is a counter circuit in which a clock input is the horizontal sync signal HD and a reset input is the vertical sync signal VD, and generates a symmetrical square wave of which polarity is reversed in a high level or a low level at every time when n-pieces of horizontal sync signals HD is counted.

Further, the 2n-divider circuit 121 is reset at every time when the vertical sync signal VD is inputted, so that a counter output, which synchronizes with the vertical scanning, enables to be obtained.

A dividing ratio of the 2n-divider circuit 121 is selected such that a switching period of the divided output results in a desired polarity reversing period. Consequently, a divided output signal from the 2n-divider circuit 121 enables to be used for a basic timing signal for switching polarity of a liquid crystal driving voltage. The symmetrical square wave outputted from the 2n-divider circuit 121 is inputted into the data terminal D of the D-FF 101 as an original control signal for switching the common electrode voltage that synchronizes with horizontal and vertical scanning timing. The succeeding stages after the D-FF 101 are the same as those of the timing control circuit 100 shown in FIG. 12, so that further details are omitted.

In case a delay circuit that delays a signal for a prescribed period is inserted between an output terminal of the 2n-divider circuit 121 and the data input terminal D of the D-FF 101 although not shown in FIG. 14, phase of a reference voltage for the horizontal sync signal HD and a polarity switching timing enables to be shifted by amount of delay caused by the delay circuit. In this case, by adjusting the amount of delay, mutual phases enables to be adjusted while maintaining synchronization between operation timing of horizontal scanning and switching operation of polarity. Consequently, it is possible to select the best condition that reduces noise generated by the mutual interference between image signal scanning and polarity switching operation minimally.

According to the sixth embodiment of the present invention, the horizontal sync signal HD is divided by the 2n-divider circuit 121 and various timing signals are synchronously produced on the basis of the divided signal. However, the timing control circuit is not limited to the one shown in FIG. 14. Any circuit enables to be acceptable as long as synchronous operation of image signal scanning and polarity switching control that are fundamental of the timing control method shown in FIGS. 13(*a*)-13(*h*) is realized.

Seventh Embodiment

In reference to FIGS. 15(*a*)-15(*h*) and 16, a driving control method for reversing polarity of a pixel polarity switching mode at scanning timing with respect to each scanning line at each vertical scanning period in the process of the synchronous operation between write-in timing of image signal and switching pixel polarity according to a seventh embodiment of the present invention is described in detail next.

Figures 15A, 15B, 15C, 15D, 15E, 15F, 15G, 15H:
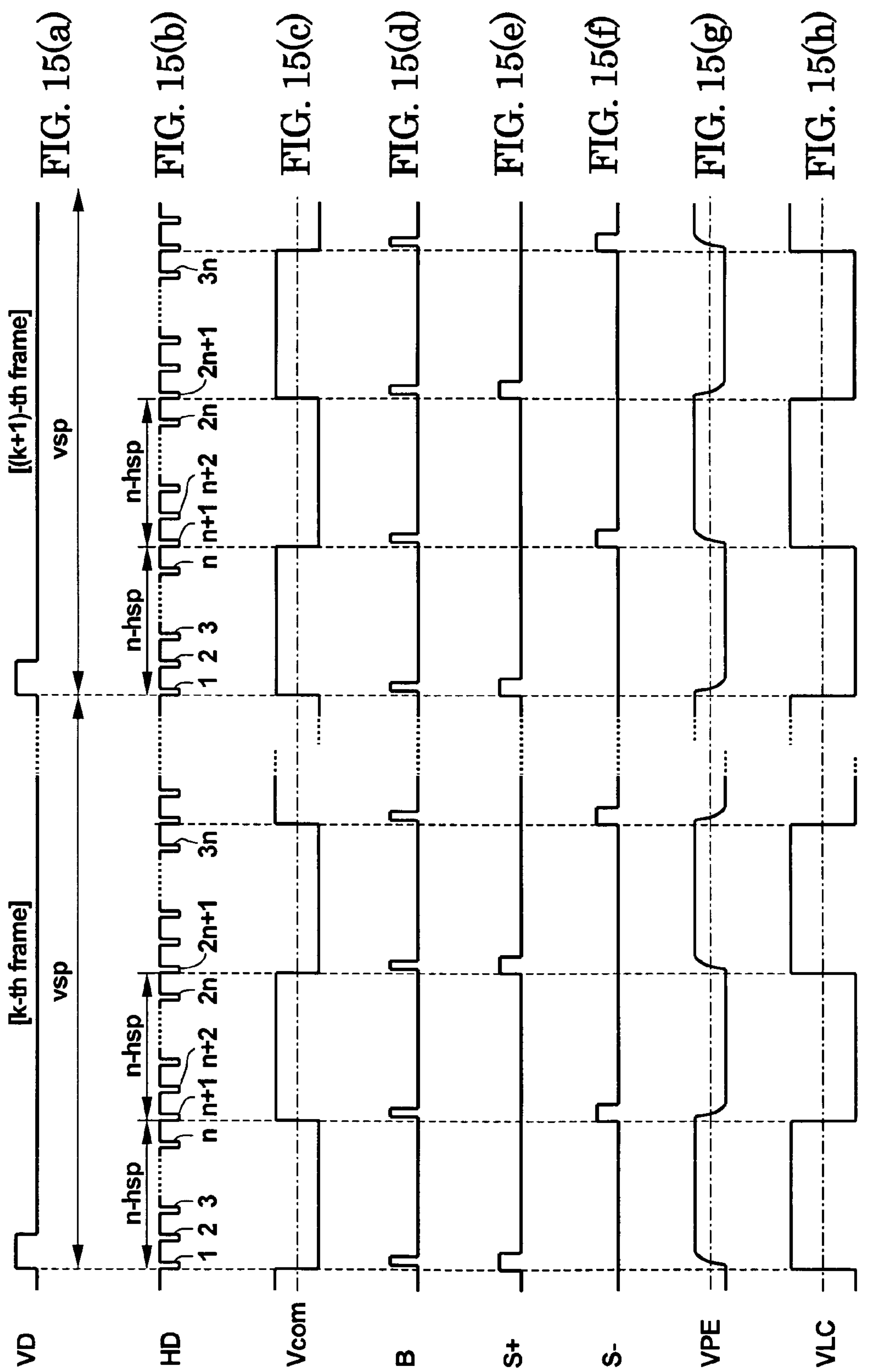
FIGS. 15(*a*)-15(*h*) are timing charts exhibiting an embodiment of driving control for reversing polarity of switching polarity of a pixel at a point of scanning with respect to each scanning line at each vertical scanning period according to a seventh embodiment of the present invention.

FIG. 15(*a*) is a waveform of a vertical sync signal VD to be supplied to a liquid crystal display apparatus corresponding to a vertical scanning period of an image signal.

FIG. 15(*b*) is a waveform of horizontal sync signal HD corresponding to a horizontal scanning period.

FIG. 15(*c*) is a waveform of a common electrode voltage Vcom.

FIG. 15(*d*) is a waveform of a load characteristic control signal on a line B.

FIG. 15(*e*) is a waveform of a positive switch control signal on a line S+.

FIG. 15(*f*) is a waveform of a negative switch control signal on a line S−.

FIG. 15(*g*) is a waveform of a driving voltage VPE applied to a pixel driving electrode PE of a pixel element.

FIG. 15(*h*) is a waveform of an AC voltage VLC applied to a liquid crystal layer.

Figure 16:
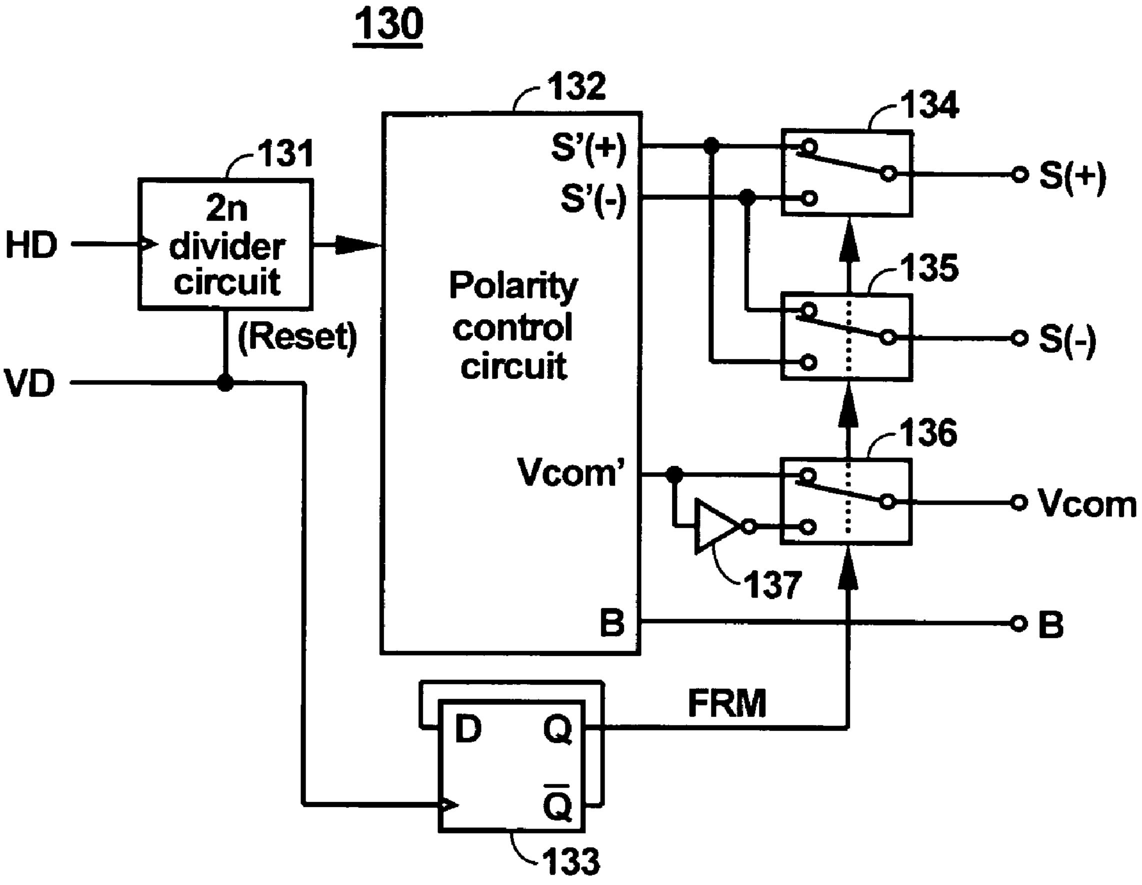
FIG. 16 is a block diagram of a timing control circuit for controlling operation timing shown in FIGS. 15(*a*)-15(*h*) according to the seventh embodiment of the present invention.

FIG. 16 is a block diagram of a timing control circuit for controlling operation timing shown in FIGS. 15(*a*)-15(*h*) according to a seventh embodiment of the present invention.

A timing control method according to the seventh embodiment of the present invention is characterized in that timing of switching polarity of pixel driving voltage or controlling timing of switching polarity of common electrode voltage and controlling timing of switching polarity of pixel driving electrode voltage is conducted to be a synchronized controlling method so as to maintain a prescribed phase relation with a frequency of the vertical sync signal VD or vertical scanning period and a frequency of the horizontal sync signal HD or horizontal scanning period and further that polarity of a pixel polarity switching mode is controlled so as to be reversed at each scanning selection line in a k-th frame and a (k+1)-th frame in which an input image signal continues.

In FIGS. 15(*a*)-15(*h*), similarly to the timing control method shown in FIGS. 13(*a*)-13(*h*), each polarity switching operation of the load characteristic control signal of the line B shown in FIG. 15(*d*), the positive switch control signal of the line S+ shown in FIG. 15(*e*) and the negative switch control signal of the line S-shown in FIG. 15(*f*) synchronizes with the vertical sync signal VD shown in FIG. 15(*a*).

Further, in a k-th frame period, during a horizontal scanning period "n-hsp" from a first line to an n-th line, the AC voltage VLC applied to an Liquid crystal layer shown in FIG. 15(*h*) is maintained in positive, wherein the pixel driving electrode voltage VPE shown in FIG. 15(*g*) is maintained in positive and the common electrode voltage Vcom shown in FIG. 15(*c*) is maintained in negative.

Furthermore, during a successive horizontal scanning period "n-hsp" from an (n+1)-th line to a 2n-th line, the AC voltage VLC shown in FIG. 15(*h*) is maintained in negative, wherein the pixel driving electrode voltage VPE shown in FIG. 15(*g*) and the common electrode voltage Vcom shown in FIG. 15(*c*) are maintained in negative and positive respectively.

More, with respect to whole scanning lines, switching polarity of pixel driving is controlled at each n-line scanning period "n-hsp".

Succeedingly, in a (k+1)-th frame period, during a horizontal scanning period "n-hsp" from a first line to an n-th line, the AC voltage VLC shown in FIG. 15(*h*) is maintained in negative, wherein the pixel driving electrode voltage VPE shown in FIG. 15(*g*) is maintained in negative and the common electrode voltage Vcom shown in FIG. 15(*c*) is maintained in positive.

Further, during a successive horizontal scanning period "n-hsp" from an (n+1)-th line to a 2*n*-th line in the (k+1)-th frame period, the AC voltage VLC shown in FIG. 15(*h*) is maintained in positive, wherein the pixel driving electrode voltage VPE shown in FIG. 15(*g*) and the common electrode voltage Vcom shown in FIG. 15(*c*) are maintained in positive and negative respectively.

In addition thereto, with respect to whole scanning lines, switching polarity of pixel driving is controlled at each n-line horizontal scanning period "n-hsp".

According to the driving control method of the seventh embodiment of the present invention, during the horizontal scanning period from the first line to the n-th line, polarity of pixel driving electrode voltage VPE is reversed at each frame such that polarity of switching pixel circuit is in positive at the k-th frame and in negative at the (k+1)-th frame.

Similarly, during the horizontal scanning period from the (n+1)-th line to the 2n-th line, polarity of pixel driving electrode voltage VPE is also reversed at each frame such that polarity of switching pixel circuit is in negative at the k-th frame and in positive at the (k+1)-th frame.

By the driving control method according to the seventh embodiment of the present invention conducting the operation timing control as mentioned above, polarity of the pixel driving electrode voltage VPE is reversed at each frame with respect to whole lines when selecting a pixel line to be scanned. Consequently, polarity of the pixel driving electrode voltage VPE is reversed at the line scanning selection timing with respect to each pixel line and averaged although display characteristic difference may occur depending on whether the scanning is conducted while the pixel driving electrode voltage VPE is in positive or in negative caused by interference between the scanning operation of image signal and the polarity switching operation.

Accordingly, the driving control method according to the seventh embodiment of the present invention enables to realize that an image is displayed high in quality and less in interference noise such as a brightness strip in the horizontal direction caused by various parasitic capacitance between the scanning operation of image signal and the polarity switching operation.

As shown in FIG. 16, a timing control circuit 130 is composed of a 2n-divider circuit 131 for dividing the horizontal sync signal HD, a polarity control circuit 132, a D-FF 133, three selector circuit 134-136 and an inverter 137. The polarity control circuit 132 produces various control signals on the basis of an output signal from the 2n-divider circuit 131. The vertical sync signal VD is inputted into a clock terminal of the D-FF 133.

The 2n-divider circuit 131 is a counter circuit in which a clock input is the horizontal sync signal HD shown in FIG. 15(*b*) and a reset input is the horizontal sync signal VD shown in FIG. 15(*a*), and generates a symmetrical square wave of which polarity is reversed in a high level or a low level at each time when n-pieces of horizontal sync signals HD is counted. In other words, polarity of the symmetrical square wave is reversed at each n-line horizontal scanning period "n-hsp".

Further, the 2n-divider circuit 131 is reset at each time when the vertical sync signal VD is inputted, that is, at each vertical scanning period "vsp". Consequently, a counter output, which synchronizes with the vertical scanning, enables to be obtained.

The polarity control circuit 132 has a similar configuration to the timing generator circuit 100 shown in FIG. 12, and produces various control signals such as S' (+), S' (−), B and Vcom' necessary for polarity switching control of a pixel driving electrode voltage VPE on the basis of a reference voltage supplied from the 2n-divider circuit 131. Hereupon, the control signal S'(+) is a positive switch control signal, the control signal S'(−) is a negative switch control signal and the control signal B is a load characteristic control signal that makes a constant current load transistor of a source follower buffer circuit in a pixel circuit to be active.

Further, the control signal Vcom' corresponds to a common electrode voltage Vcom of a liquid crystal display element.

The D-FF 133 is a divide-into-two circuit and generates a symmetrical square wave of which polarity is reversed in a high level or a low level at each time when the vertical sync signal VD is inputted, and then controls the selector circuits 134-136 by supplying the symmetrical square wave to each selector terminal of them as a select signal FRM. In other words, a logical level of the select signal FRM reverses at each vertical sync signal VD period, that is, at each vertical scanning period "vsp" or at each frame period.

The selector circuits 134 and 135 receive the positive switch control signal S' (+) and the negative switch control signal S' (−) respectively as an input signal. When the select signal FRM is in a high level, one selector circuit selects the positive switch control signal S'(+) and the other selector selects the negative switch control signal S'(−). On the other hand, when the select signal FRM is in a low level, the one selector circuit selects the negative switch control signal S'(−) and the other selector selects the positive switch control signal S'(+). Consequently, the selector circuit 134 outputs a positive switch control signal S(+) of which polarity reverses at each frame and the selector circuit 135 outputs a negative switch control signal S(−) of which polarity reverses at each frame.

Further, the selector circuit 136 selects either the control signal Vcom' or another control signal that is an inverted control signal Vcom' by the inverter 137 on the basis of the select signal FRM, and then outputs the selected control signal as the common electrode voltage Vcom.

As a result, the timing control circuit 130 shown in FIG. 16 according to the seventh embodiment of the present invention outputs each control signals shown in FIGS. 15(*c*)-15(*f*). By using the control signals outputted from the timing control circuit 130, as mentioned above with reference to FIGS. 15(*a*)-15(*h*), writing-in an image signal, that is, the timing of vertical and horizontal scanning is synchronized with the timing of switching pixel polarity. At the same time, the polarity of pixel driving electrode voltage VPE at the timing of line scanning selection is reversed at each frame, and then averaged.

Accordingly, the timing control circuit 130 according to the seventh embodiment of the present invention enables to realize a liquid crystal display apparatus that displays an image high in quality and less in interference noise caused by various parasitic capacitance between the scanning operation of image signal and the polarity switching operation.

In addition, such a timing control circuit is not limited to the circuit configuration shown in FIG. 16. Any circuit enables to be applicable as long as the fundamentals of the timing control method mentioned above in reference to FIGS. 15(*a*)-15(*h*) enable to be realized.

By the liquid crystal display apparatus according to each embodiment of the present invention as mentioned above, an AC driving frequency of liquid crystal enables to be freely designated by a reverse control period of pixel circuit independently of a vertical scanning frequency. For instance, with assuming that a vertical scanning frequency is 60 Hz that is commonly used in a TV receiver and number of vertical scan lines is 1125 lines, an AC driving frequency of liquid crystal in the liquid crystal display apparatus according to the present invention is 2.25 kHz in case a polarity switching period of pixel circuit is assigned to a 15-line period, wherein 2.25 kHz=60 Hz×1125÷(15×2).

On the other hand, in the case of a conventional active matrix liquid crystal display apparatus, a vertical scanning frequency is converted into twice the regular vertical scanning frequency 60 Hz, that is, 120 Hz by a frame memory and polarity of image signal is reversed at each vertical scanning frequency. In such a conventional active matrix liquid crystal display apparatus, an AC driving frequency of liquid crystal is half the converted vertical scanning frequency 120 Hz, that is, 60 Hz. Under such a driving condition as an AC driving frequency is within a range from tens of Hz to 100 Hz, liquid crystal is easily affected by residual electric charge, and resulting in problem of deteriorating reliability and stability.

Further, material characteristics of liquid crystal are apt to be extremely affected by deteriorated displaying quality caused by defective displaying such as blot resulted from an ion component and a mixed foreign object.

Contrary to the conventional active matrix liquid crystal display apparatus, as mentioned above, the AC driving frequency of the active matrix liquid crystal display apparatus according to the present invention is an extremely higher frequency than 60 Hz that is the conventional AC driving frequency of the conventional active matrix liquid crystal display apparatus.

Accordingly, the active matrix liquid crystal display apparatus of the present invention enables to improve reliability, stability and displaying quality furthermore than those of the conventional active matrix liquid crystal display apparatus.

Eighth Embodiment

In reference to FIGS. 17-19(*j*), a total configuration of a liquid crystal display apparatus and a sampling circuit or horizontal driver circuit according to a eighth embodiment of the present invention are described in detail next.

Figure 17:
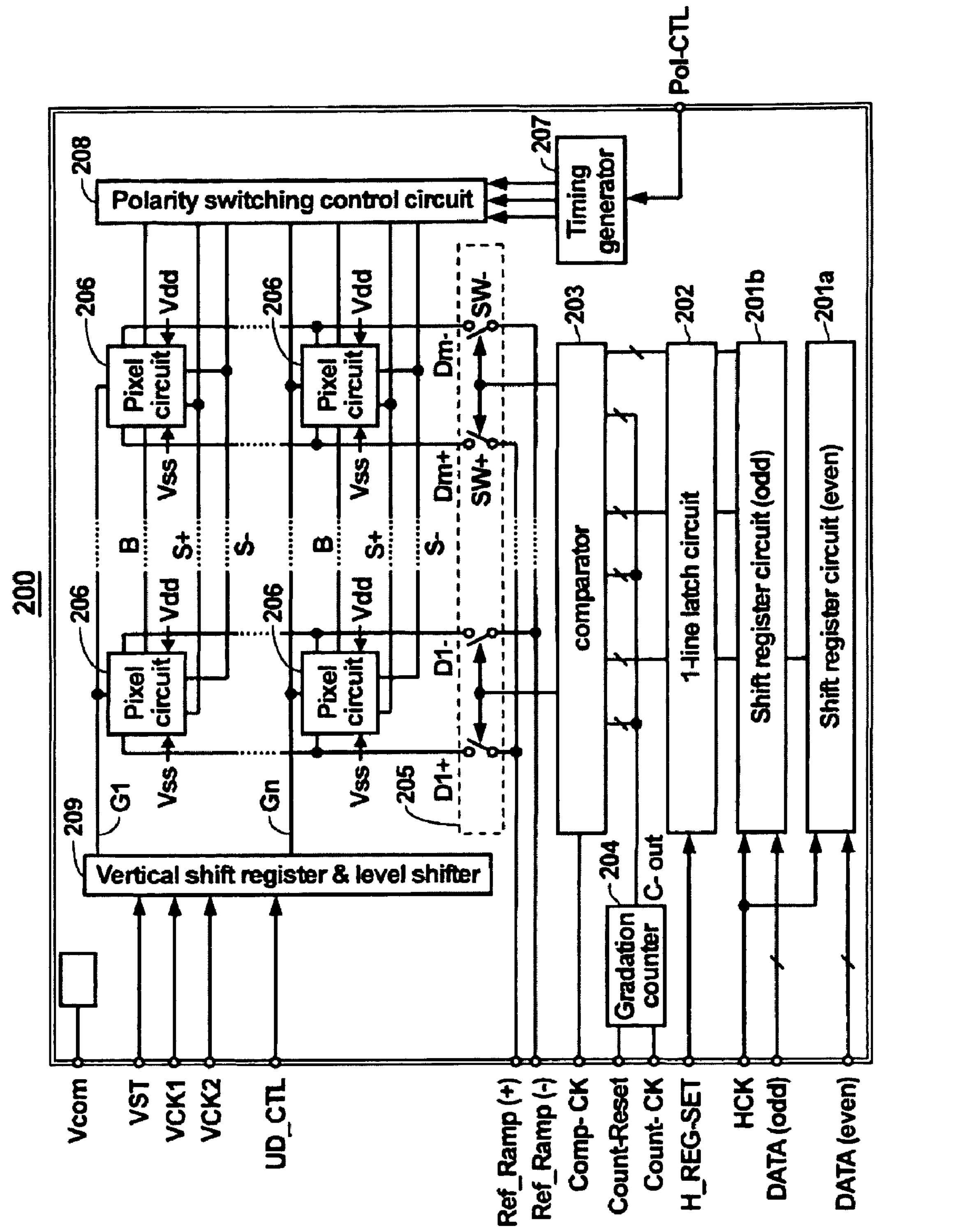
FIG. 17 is an entire constitutional diagram of a liquid crystal display apparatus according to a eighth embodiment of the present invention.

FIG. 17 is an entire constitutional diagram of a liquid crystal display apparatus according to the eighth embodiment of the present invention.

Figure 18:
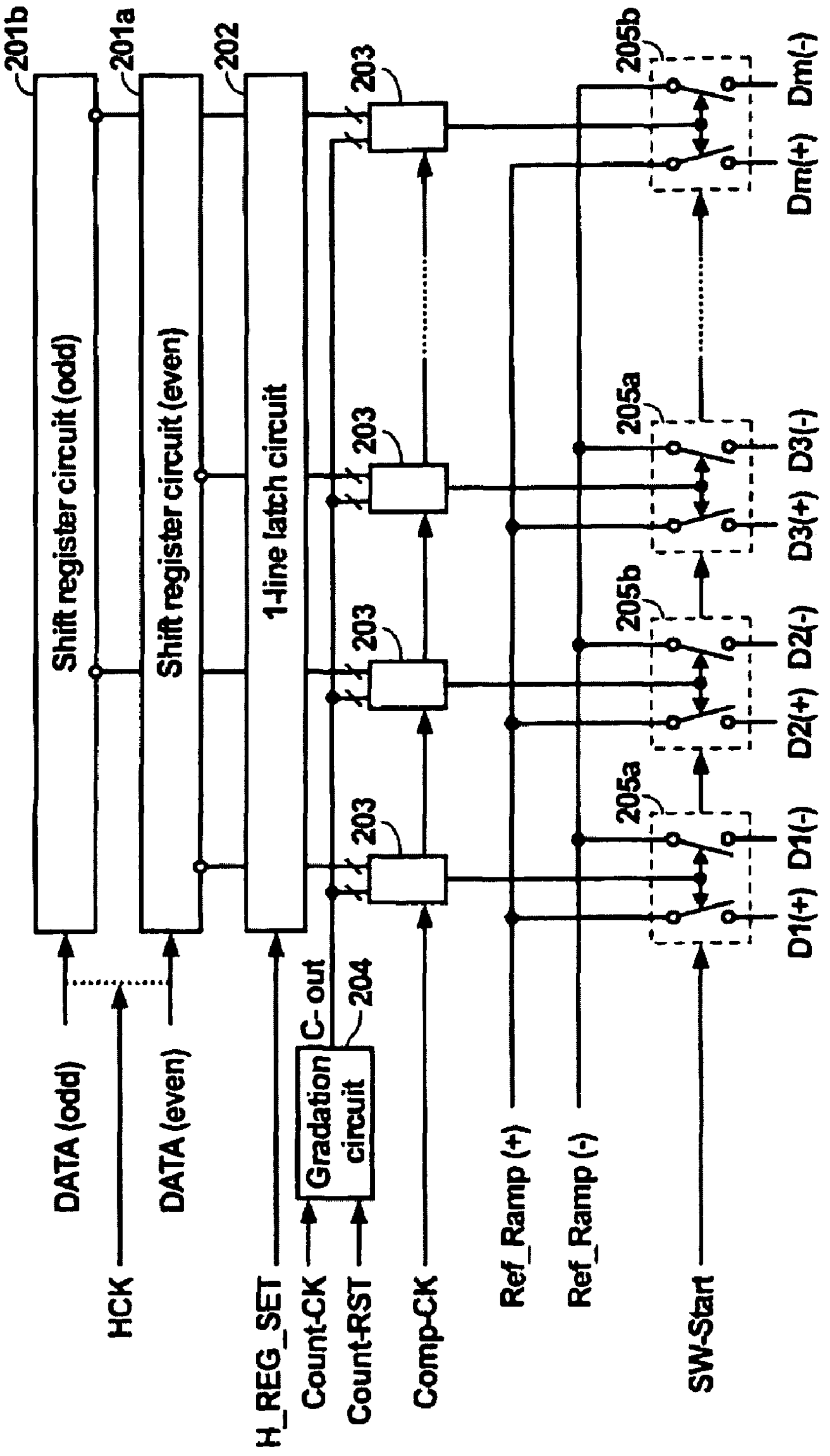
FIG. 18 is a block diagram of a horizontal driver circuit shown in FIG. 17.

FIG. 18 is a block diagram of a horizontal driver circuit shown in FIG. 17.

Figures 19A, 19B, 19C, 19D, 19E, 19F, 19G, 19H, 19I, 19J:
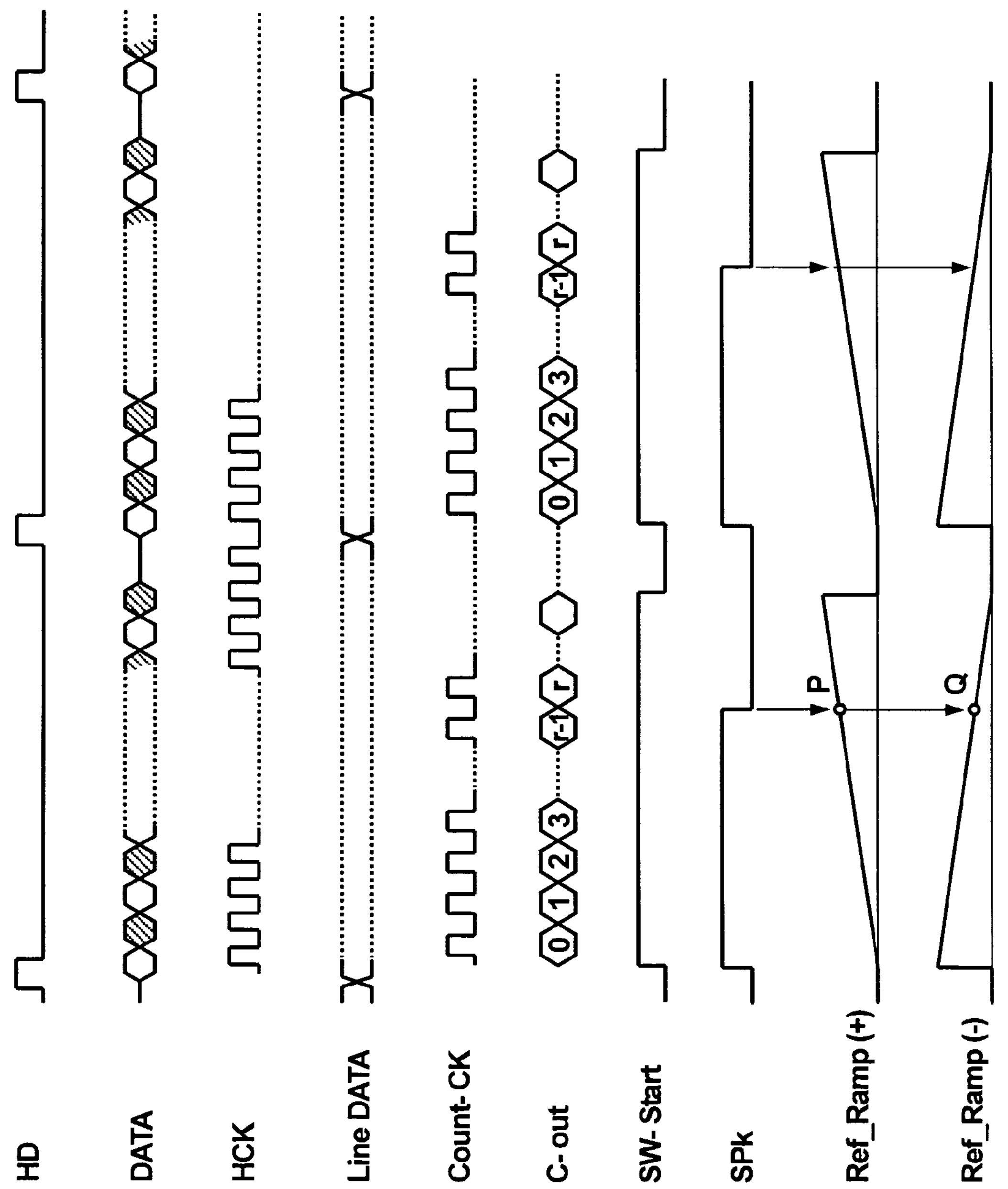
FIGS. 19(*a*)-19(*j*) are timing charts for explaining operations of the liquid crystal display apparatus shown in FIGS. 17 and 18.

FIGS. 19(*a*)-19(*j*) are timing charts for explaining operations of the liquid crystal display apparatus shown in FIGS. 17 and 18.

More specifically, FIG. 19 (*a*) is a waveform of a horizontal sync signal HD. FIG. 19(*b*) is a waveform of a plurality of bits of pixel data "DATA" of an image, FIG. 19(*c*) is a waveform of horizontal clock signal HCK, FIG. 19(*d*) is a waveform of line data "Line DATA" in one line period, FIG. 19(*e*) is a waveform of a clock signal "Count-CK", FIG. 19(*f*) is a waveform of reference gradation data "C-out" exhibiting a value of gradation level, FIG. 19(*g*) is a waveform of an analog switch start signal "SW-Start", FIG. 19(*h*) shows a waveform "SPk" of switching timing of analog switch, FIG. 19(*i*) is a waveform of a positive reference ramp voltage "Ref_Ramp (+)" and FIG. 190) is a waveform of a negative reference ramp voltage "Ref_Ramp (−)".

In FIG. 17, a liquid crystal display apparatus 200 is composed of two shift resistor circuits 201*a* and 201*b*, a 1-line latch circuit 202, a comparator 203, a gradation counter 204, a plurality of analog switches 205, a plurality of pixel circuits 206, a timing generator 207, a polarity switching control circuit 208 and a vertical shift register & level shifter 209. The plurality of pixel circuits 206 is disposed in matrix such as m-pieces in the horizontal direction and n-pieces in the vertical direction.

The shift resistor circuits 201*a* and 201*b*, the 1-line latch circuit 202, the comparator 203 and the gradation counter 204 constitute a horizontal driver circuit. The horizontal driver circuit corresponds to the horizontal driver circuit 10 in FIG. 2 and constitutes a data line driving circuit together with the analog switches 205. The data line driving circuit is also shown in FIG. 18.

In addition, the comparator 203 is illustrated with just one block in FIG. 17 for the purpose of simplification. However, the comparator 203 is actually provided at each pixel row as shown in FIG. 18.

Each of the analog switches 205 shown in FIGS. 17 and 18 is constituted by one pair of two analog switches for sampling (hereinafter referred to as sampling switch) such as one for positive and the other for negative, and disposed at each pixel row. The positive sampling switch corresponds to the switches (S1-1*a*)-(S1-2*a*) shown in FIG. 2 and the negative sampling switch corresponds to the switches (S1-1*b*)-(S1-2*b*). The pixel circuit 206 is disposed at an intersection of two systems of data lines (D1+ and D1−)-(Dm+ and Dm−) and gate lines G1-Gn. Each of the (n×m) pieces of pixel circuits 206 is constituted as the same circuitry as shown in FIG. 3 or in FIG. 4.

The polarity switching control circuit 208 outputs a positive switch control signal, a negative switch control signal and a load characteristic control signal to the line S+, the line S− and the line B respectively in accordance with a timing signal emitted from the timing generator 207. The timing generator 207 emits the respective control signals on the basis of a polarity control signal "Pol-CTL" supplied externally. In addition, the polarity switching control circuit 208 is constituted as the same circuitry as shown in FIG. 12, 14 or 16.

The vertical shift register & level shifter 209 corresponds to the vertical driver circuit 20 shown in FIG. 2.

Further, in one horizontal scanning period, the vertical shift register & level shifter 209 outputs a gate signal sequentially to the gate lines G1-Gn on the basis of a driving pulse signal "VST" supplied externally at each time when first and second clock signals "VCK1" and "VCK2" are inputted. Then the vertical shift register & level shifter 209 sequentially selects the gate lines G1-Gn in one horizontal scanning period.

Furthermore, the vertical shift register & level shifter 209 controls the vertical scanning direction such as downward from top to bottom and upward from bottom to top on the basis of an up/down control signal "UD_CTL" supplied externally.

In reference to FIGS. 19(*a*)-190), operations of the liquid crystal display apparatus 200 show in FIGS. 17 and 18 are detailed next.

A plurality of bits of pixel data "DATA" shown in FIG. 19(*b*), which synchronizes with the horizontal sync signal HD shown in FIG. 19(*a*), is synthesized in time sequence, and then resulted in a digital image signal. The digital image signal is sequentially expanded by the shift registers 201*a* and 201*b* as one line of data, and then latched by the 1-line latch circuit 202 when expanding one line is completed.

Further, as shown in FIG. 19(*b*), the plurality of bits of pixel data "DATA" is composed of a blanked pixel data bit and a hatched pixel data bit alternately disposed in an array. Each of blanked pixel data bits disposed at an even row in the horizontal direction (hereinafter referred to as even data) is supplied to the shift register 201*a* and each of hatched pixel data bits disposed at an odd row in the horizontal direction (hereinafter referred to as odd data) is supplied to the shift register 201*b*. The above-mentioned supplying method of the pixel data "DATA" is for the purpose of easier application to a high-speed operation in a high-resolution panel.

The 1-line latch circuit 202 stores one line period of the pixel data "DATA" in the same line that is composed of even data outputted from the shift register 201*a* and odd data from the shift register 201*b* and formed in a pattern exemplary shown in FIG. 19(*d*) as data "Line-DATA", and then supplies the data "Line-DATA" to a first data input section of the comparator 203 in each pixel row. The 1-line latch circuit 202 is controlled by a latch set control signal "H_REG-SET" supplied externally.

The gradation counter 204 counts the clock signal "Count-CK" shown in FIG. 19(*e*) and outputs the reference gradation data "C-out" shown in FIG. 19(*f*) at each horizontal scanning period. Then the gradation counter 204 supplies the reference gradation data "C-out" to a second data input section of the comparator 203 in each pixel row.

Further, the gradation counter 204 is reset at each horizontal scanning period by a reset signal "Count-Reset" supplied externally.

Furthermore, the reference gradation data "C-out" is such data as a plurality of gradation values sequentially varies from a minimum value "0" to a maximum value within the horizontal scanning period as shown in FIG. 19(*f*).

The comparator 203 compares a value of the pixel data "DATA" inputted into the first input terminal and a value of the reference gradation data "C-out" or a gradation value inputted into the second input terminal, and produces a coincident pulse at each timing when both values coincide with each other on the basis of a clock signal "Comp-CK", and then output the coincide pulse.

The positive sampling switch out of one pair of positive and negative sampling switches constituting the analog switches 205 is supplied with the reference ramp voltage Ref_Ramp (+) shown in FIG. 19(*i*) to an input side common line. On the other hand, the negative sampling switch is supplied with the reference ramp voltage Ref_Ramp (−) shown in FIG. 190) to an input side common line. These reference ramp voltages Ref_Ramp (+) and Ref_Ramp (−) are generated by a reference voltage generator circuit installed in the controller 60 shown in FIG. 2. As shown in FIG. 19(*i*), the reference ramp voltage Ref_Ramp (+) is a periodic sweep signal of which level increases from a black level of image to a white level in accordance with elapsed time within the horizontal scanning period. On the other hand, the reference ramp voltage Ref_Ramp (−) is also a periodic sweep signal of which level decreases from a black level of image to a white level in accordance with elapsed time within the horizontal scanning period. Consequently, the reference ramp voltages Ref_Ramp (+) and Ref_Ramp (−) are in relation of reverse with respect to a prescribed reference potential.

The analog switches 205 are supplied with the "SW-Start" signal shown in FIG. 19(*g*) and simultaneously switched ON at the start time of the horizontal scanning period, and then controlled so as to be shifted to an OFF state when the coincident pulse is supplied from the comparator 203. In the timing charts shown in FIGS. 19(*a*)-19(*j*), On-OFF timing of an analog switch 205 disposed in a pixel row corresponding to the pixel data "DATA" at a gradation level "r" of the reference gradation data "C-out" is exemplarily shown as the waveform "Spk" in FIG. 19(*h*). Consequently, action levels "P" and "Q" shown in FIGS. 19(*i*) and (*j*) of the reference ramp voltages Ref_Ramp (+) and Ref_Ramp (−) are simultaneously sampled at the time when the one pair of positive and negative sampling switches constituting the analog switch 205 in the pixel row are simultaneously switched OFF by the coincident pulse, and then the sampled data are outputted to each pair of pixel data lines D (+)-Dm (+) and D1 (−)-Dm (−) corresponding to the pixel row.

As mentioned above, the horizontal driver circuit according to the eighth embodiment of the present invention enables to supply positive and negative pixel data to each pixel even in a simple configuration.

Further, by the horizontal driver circuit according to the eighth embodiment of the present invention, an image signal enables to be interfaced with the liquid crystal display apparatus shown in FIG. 17 in a digital signal, so that it is not necessary to install an analog circuit block for processing in high accuracy a broadband image signal as an external driving circuit. Consequently, necessary cost for circuitry enables to be reduced.

Ninth Embodiment

In reference to FIG. 20, another horizontal driver circuit of the liquid crystal display apparatus according to a ninth embodiment of the present invention is described in detail next.

Figure 20:
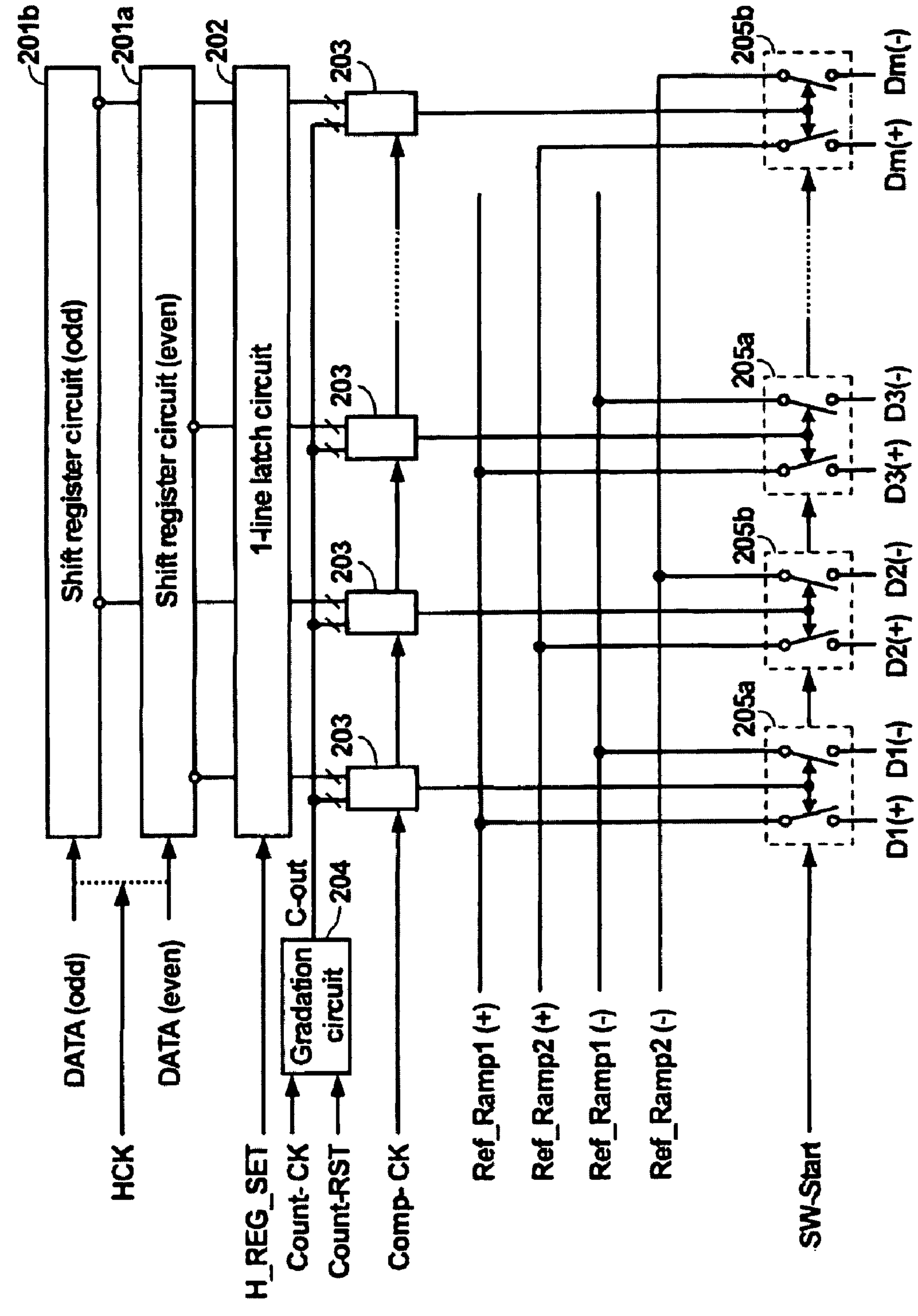
FIG. 20 is a block diagram of another horizontal driver circuit of the liquid crystal display apparatus according to a ninth embodiment of the present invention.

FIG. 20 is a block diagram of another horizontal driver circuit of the liquid crystal display apparatus according to the ninth embodiment of the present invention.

The other horizontal driver circuit shown in FIG. 20 is the same as the horizontal driver circuit shown in FIG. 18 except for number of electric supply lines of reference ramp voltages, so that the same components as shown in FIG. 18 are denoted by the same reference signs and their details are omitted.

As shown in FIG. 20, the other horizontal driver circuit is provided with four lines for two pairs of positive and negative reference ramp voltages Ref_Ramp1 (+)-Ref_Ramp1 (−) and Ref_Ramp2 (+)-Ref_Ramp2 (−).

In FIG. 20, one positive reference ramp voltage Ref_Ramp1 (+) is supplied to each input terminal of each analog switch 205*a* corresponding to each pixel in an even-numbered row in the horizontal direction and the other positive reference ramp voltage Ref_Ramp2 (+) is supplied to each input terminal of each analog switch 205*b* corresponding to each pixel in an odd-numbered row in the horizontal direction.

Similarly, one negative reference ramp voltage Ref_Ramp1 (−) is supplied to each input terminal of each analog switch 205*a* corresponding to each pixel in an even-numbered row in the horizontal direction and the other negative reference ramp voltage Ref_Ramp2 (−) is supplied to each input terminal of each analog switch 205*b* corresponding to each pixel in an odd-numbered row in the horizontal direction.

In the case of the horizontal driver circuit shown in FIG. 18, during a period while an analog switch 205 in a pixel row corresponding to a gradation level equivalent to displaying a flat gray screen is shifted to an OFF-state, whole analog switches 205 stay a period of ON-state. During the continuing ON period, a pixel data line of an output side of an analog switch 205 functions as load with respect to a reference ramp voltage line. Consequently, when displaying a flat gray screen, the load makes a waveform of a reference ramp voltage delay and brightness of original gray screen may be decreased.

On the other hand, in the case of displaying an image mixed with gray and black in the horizontal direction, analog switches 205 in pixel rows corresponding to a black area are switched OFF first and load to the reference ramp voltage line is cut-off from the analog switches 205, and resulting in reducing the load. Then, brightness of gray area increases. Consequently, a gray area displayed on both sides of a black area is made to be brighter than a gray area evenly displayed in whole areas in the horizontal direction, so that an image noise in a so-called horizontal pulling shape may occur.

Contrary to the horizontal driver circuit shown in FIG. 18, in the case of the horizontal driver circuit shown in FIG. 20, the reference ramp voltage line is divided into two groups, so that load to each reference ramp voltage line is reduced during the ON period while the analog switches 205*a* and 205*b* in each pixel row are in the ON period, and resulting in reducing delay of a waveform of the reference ramp voltage. Consequently, the horizontal driver circuit shown in FIG. 20 enables to realize displaying characteristics high in image quality and low in noise.

Further, two groups of reference ramp voltage lines are illustrated in FIG. 20. However, increasing number of groups enables to conduct excellent displaying characteristics furthermore.

Tenth Embodiment

In reference to FIG. 21, circuitry and a method of supplying a reference voltage to a horizontal driver circuit in the liquid crystal display apparatus according to a tenth embodiment of the present invention is described in detail next.

Figure 21:
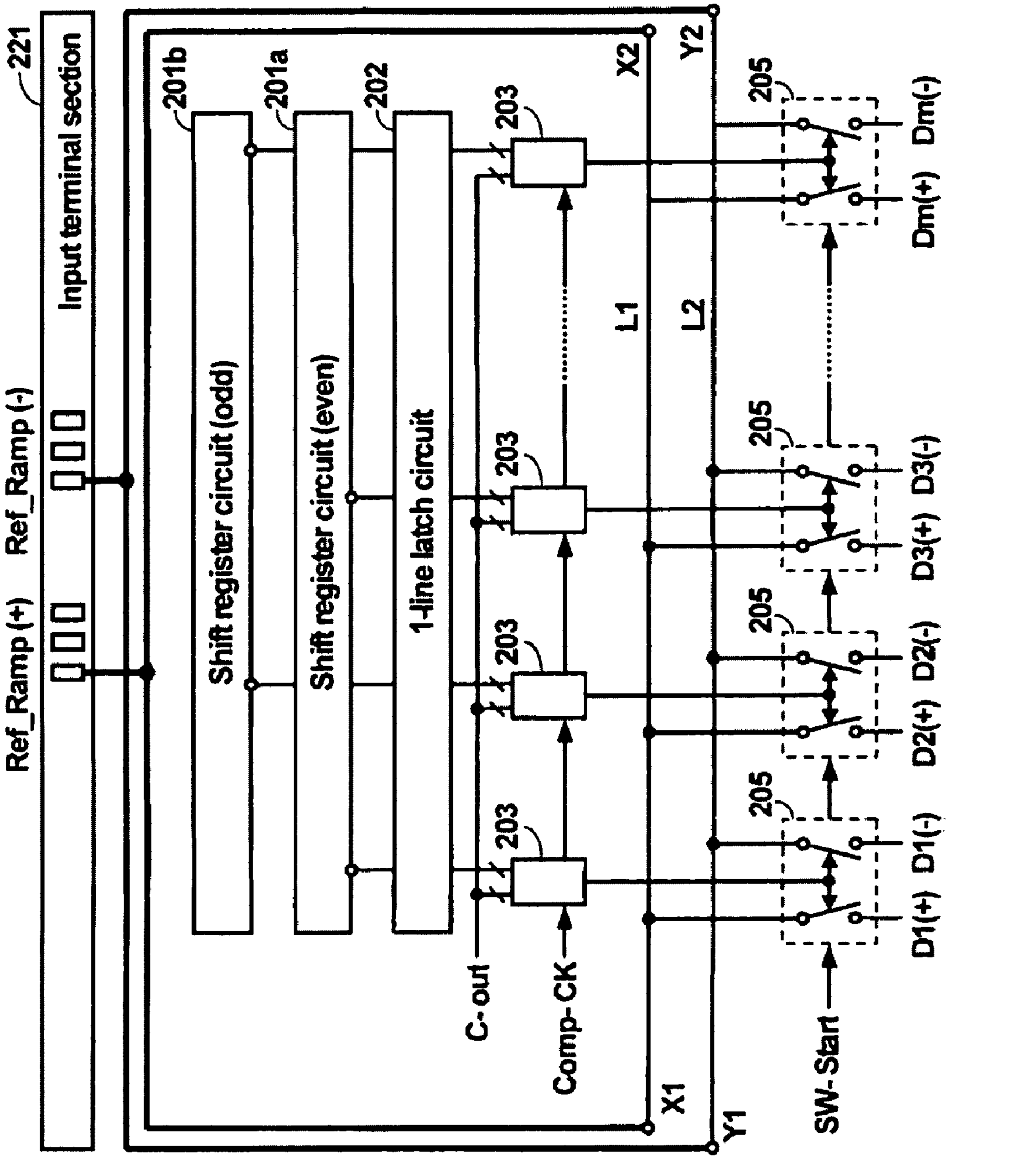
FIG. 21 is a constitutional diagram of supplying a reference voltage to a horizontal driver circuit in the liquid crystal display apparatus according to a tenth embodiment of the present invention.

FIG. 21 is a constitutional diagram of supplying a reference voltage to a horizontal driver circuit in the liquid crystal display apparatus according to a tenth embodiment of the present invention. The constitutional diagram shown in FIG. 21 is similar to that shown in FIG. 18, so that the same components as shown in FIG. 18 are denoted by the same reference number and their details are omitted.

As shown in FIG. 21, a plurality of feeding points X1, X2, Y1 and Y2 are provided on electric supply lines L1 and L2 for a reference ramp voltage to be supplied to the analog switches 205 constituting the horizontal driver circuit shown in FIG. 18, wherein the feeding points X1, X2, Y1 and Y2 are individually disposed in a longitudinal direction of the electric supply lines L1 and L2.

Further, the feeding points X1 and X2 are connected to an input terminal of the positive reference ramp voltage Ref_Ramp (+) provided in an input terminal section 221 and the feeding points Y1 and Y2 are connected to another input terminal of the negative reference ramp voltage Ref_Ramp (−) provided in the input terminal section 221. By this configuration, wiring length of electric supply line of the reference ramp voltage enables to be shortened, and resulting in reducing a resistance component of the electric supply line of the reference ramp voltage.

Accordingly, displaying characteristic is improved higher in displaying quality and low in visible noise.

As mentioned above, according to the present invention, liquid crystal enables to be driven in a higher speed without increasing a write-in frequency with respect to a pixel, so that a DC component between the pixel driving electrode and the common electrode enables to be reduced, and resulting in improving image quality and reliability of the liquid crystal display apparatus such as preventing liquid crystal from burn-in. At the same time, margin of adjusting common electrode voltage is increased, and resulting in improving productivity also.

In other words, reliability, stability and displaying quality of liquid crystal enables to be significantly improved even though the liquid crystal is driven by a lower frequency.

Further, a liquid crystal display apparatus low in manufacturing cost enables to be realized by effects of improved fabrication yield and minimized driving circuit.

Furthermore, such improvement denotes that tolerance for characteristic variation of liquid crystal is increased, and resulting in reducing manufacturing cost.

While the invention has been described above with reference to a specific embodiment thereof, it is apparent that many changes, modifications and variations in configuration, materials and the arrangement of equipment and devices can be made without departing from the invention concept disclosed herein.

For instance, in FIG. 21, number of the feeding points is four and provided on both ends of the electric supply lines L1 and L2 respectively. However, the number of feeding points enables to be increased as needed.

Further, it is also applicable for the above-mentioned plurality of feeding points to combine with a configuration such as dividing a plurality of electric supply lines for reference ramp voltages into a plurality of groups as shown in FIG. 20.

Furthermore, in FIG. 21, number of input terminal sections 221 is just one for each electric supply line of the reference ramp voltage. However, a plurality of input terminal sections enables to be assigned, and then reference ramp voltages enable to be supplied through the plurality of input terminal sections.

In addition thereto, it will be apparent to those skilled in the art that various modifications and variations could be made in the bearing device and the motor mounted with the bearing device in the present invention without departing from the scope of the invention.

What is claimed is:

1. A liquid crystal display apparatus comprising:
- a plurality of pixels disposed at each intersection of plural pairs of data lines and a plurality of gate lines;
- a plurality of switches provided to each of the plural pairs of data lines supplying a positive image signal to one data line of a pair of data lines and a negative image signal to the other data line of the pair of data lines with respect to each pair of the plural pairs of data lines sequentially one by one; and
- driver means in the horizontal and vertical directions for driving the plurality of switches in the horizontal direction by each pair of data lines within a horizontal scanning period and for selecting the plurality of gate lines in the vertical direction at each horizontal scanning period;
- wherein each of the plurality of pixels is provided with:
- a liquid crystal element having a liquid crystal layer sandwiched between a pixel driving electrode and a common electrode confronting with each other;
- a first sampling and holding means for sampling the positive image signal and holding a voltage of the sampled positive image signal for a prescribed period of time;
- a second sampling and holding means for sampling the negative image signal and holding a voltage of the sampled negative image signal for the prescribed period of time; and
- a switching means for switching a positive image signal voltage held in the first sampling and holding means and a negative image signal voltage held in the second sampling and holding means in a prescribed period shorter than a vertical scanning period and supplying the positive and negative image signal voltages alternately to the pixel driving electrode.

2. The liquid crystal display apparatus claimed in claim 1, wherein each of the plurality of pixels further comprises:
- a first buffer amplifier converting impedance of the positive image signal voltage held in the first sampling and holding means; and a second buffer amplifier converting impedance of the negative image signal voltage held in the second sampling and holding means, and further wherein the switching means switches the positive and the negative image signal voltages respectively outputted from the first and second buffer amplifiers alternately within the prescribed period.

3. The liquid crystal display apparatus claimed in claim 2, wherein a load element common to the first and second buffer amplifiers is connected between an output terminal of the switching means and a ground potential.

4. The liquid crystal display apparatus claimed in claim 2, wherein the first and second buffer amplifiers are respectively composed of an impedance conversion transistor and a constant electric current load transistor capable of controlling a channel electric current characteristic by a bias voltage applied to a gate terminal of the constant electric current load transistor, and wherein the liquid crystal display apparatus further comprises a control means for controlling the bias voltage to make the constant electric current load transistor to be intermittently active in synchronism with switching timing of the switching means at the prescribed period.

5. The liquid crystal display apparatus claimed in claim 4 further comprising a time division control means for controlling a plurality of the constant electric current load transistors in a plurality of divided groups so as to be active in time division-wise by each divided group when a whole pixel section composed of the plurality of pixels constituting a display screen is divided into a plurality of groups with grouping each pixel in a continuing plurality of pixel lines.

6. The liquid crystal display apparatus claimed in claim 1 further comprising a common electrode voltage control means for changing a level of common electrode voltage applied to the common electrode to be within two different levels so as to make an absolute value of potential difference across the liquid crystal layer to be approximately the same value in synchronism with timing of switching the positive and negative image signal voltages to be applied to the pixel driving electrode.

7. The liquid crystal display apparatus claimed in claim 6, wherein the common electrode voltage control means changes the level of common electrode voltage applied to the common electrode so as to be within two different levels prior to the timing of switching the positive and negative image signal voltages to be applied to the pixel driving electrode.

8. The liquid crystal display apparatus claimed in claim 1 further comprising:

a pixel inspection switching means for inspecting pixels connected between the pixel driving electrode and one data line of the pair of data lines; and a pixel inspection control means for reading out a pixel driving electrode voltage from the pixel driving electrode to the one data line through the pixel inspection switching means by switching OFF the pixel inspection switching means when displaying an image while the positive image signal voltage and the negative image signal voltage are alternately switched and supplied to the pixel driving electrode or by switching ON the pixel inspection switching means when inspecting the pixel.

9. The liquid crystal display apparatus claimed in claim 8, wherein the pixel inspection control means controls to switch OFF whole pixel inspection switching means disposed in the plurality of pixels constituting a displaying screen when displaying the image, and controls to switch ON the pixel inspection switching means disposed in each pixel in the same pixel line out of the plurality of pixels by each pixel line when inspecting the pixel.

10. The liquid crystal display apparatus claimed in claim 6 further comprising:

a timing control means for controlling a switching period of the positive and negative image signal voltages by the switching means and a level changing period of the common electrode voltage by the common electrode voltage control means to be N-times a horizontal scanning period that is a selection period of the plurality of gate lines, where N is an arbitrary natural number, and for controlling reference timing of starting vertical scanning to be operated in a prescribed phase relation at each frame.

11. The liquid crystal display apparatus claimed in claim 10, wherein the timing control means controls mutual timing of switching the pixel driving electrode voltage and the common electrode voltage to make polarity of the level changing period of the common electrode voltage and polarity of the switching period of the pixel driving electrode voltage to be reversed at each scanning frame during a period of writing the image signal into each pixel in a continuing plurality of lines within a same polarity period in a polarity reversing control period.

12. A data line driving circuit of a liquid crystal display apparatus comprising:

a shift register circuit sequentially storing a digital image signal that is plural bits of pixel data synthesized in time sequence-wise;

a latch circuit storing one line of digital image signals to be sequentially stored in the shift register circuit for one horizontal scanning period;

a gradation counter outputting reference gradation data in which a plurality of gradation values sequentially changes in the horizontal scanning period;

a comparator generating a coincident pulse when a value of one line of the pixel data outputted from the latch circuit coincides with a gradation value of the reference gradation data outputted from the gradation counter after comparing both values;

a reference voltage generator circuit generating a first reference voltage that is a periodical sweep signal changing in a direction of increasing a level of an image from a black level to a white level in the horizontal scanning period or in a direction of decreasing the level from a white level to a black level in the horizontal scanning period and a second reference voltage that is a periodic sweep signal having a reverse relation to the first reference voltage with respect to a prescribed potential; and a plurality of analog switches provided on each pair of data lines in a pixel disposed in the same row out of plural pairs of gate lines connected to each intersection of a plurality of pixels and a plurality of gate lines, sampling the first and second reference voltages respectively on the basis of the coincide pulse, and generating a driving signal having a level corresponding to generation timing of the coincide pulse, and then outputting the driving signal;

wherein the first reference voltage is commonly inputted into each first input terminals of the plurality of analog switches and the second reference voltage is commonly inputted into each second input terminals of the plurality of analog switches, and wherein the plurality of analog switches outputs a first driving signal obtained by sampling the first reference voltage on the basis of the coincide pulse with respect to one data line of each pair of data lines provided to corresponding input terminals, at the same time outputs a second driving signal obtained by sampling the second reference voltage on the basis of the coincide pulse with respect to the other data line.

13. The data line driving circuit of a liquid crystal display apparatus claimed in claim 12, wherein the reference voltage generator circuit divides the first and second reference voltages and outputs the divided first and second reference voltages to plural pairs of line groups in which a first line transmitting the first reference voltage and a second line transmitting the second reference voltage are paired, and wherein the plurality of pixels is divided into a plurality of groups of pixel rows, and further wherein the first and second input terminals of the analog switch in each group of pixel rows disposed in the plurality of pixels are respectively connected to the first and second lines of each pair of line groups in the plural pairs of line groups assigned to each of the first and second input terminals respectively.

14. The data line driving circuit of a liquid crystal display apparatus claimed in claim 12 further comprising a plurality of feeding points disposed in different positions on first and second lines in the longitudinal direction, wherein the first and second lines transmit the first and second reference voltages from the reference voltage generator circuit to the first and second input terminals of the plurality of analog switches respectively.

15. A driving method of a liquid crystal display apparatus comprising the steps of:

first sampling for sampling a driving voltage corresponding to a positive image signal to be transmitted through one data line of each pair of data lines in each of a plurality of pixels disposed at each intersection of plural pairs of data lines and a plurality of gate lines for a prescribed period shorter than a vertical scanning period and for holding the sampled driving voltage for a first prescribed period of time;

second sampling for sampling a driving voltage corresponding to a negative image signal to be transmitted through the other data line of each pair of data lines in each of the plurality of pixels disposed at each intersection of the plural pairs of data lines and the plurality of gate lines for the prescribed period shorter than the vertical scanning period and for holding the sampled driving voltage for the first prescribed period of time;

first impedance converting for making active a first buffer amplifier converting impedance of the held positive image signal voltage for a second prescribe period of time in synchronism with the sampling process in the step of first sampling;

second impedance converting for making active a second buffer amplifier converting impedance of the held negative image signal voltage for the second prescribe period of time in synchronism with the sampling process in the step of second sampling; and applying pixel driving electrode voltage for applying the positive and negative image signal voltages of which impedance is converted through the impedance conversion processes in the steps of first and second impedance converting, alternately to each pixel driving electrode of each pixel disposed in the plurality of pixels.

16. The driving method of a liquid crystal display apparatus claimed in claim 15 further comprising the step of:

time division controlling for controlling each load element of the first and second buffer amplifiers in a plurality of divided groups to be active by each divided group in time division-wise when a whole pixel section composed of the plurality of pixels constituting a display screen is divided into the plurality of divided groups in which one group is composed of each pixel in a continuing plurality of pixel lines.

17. The driving method of a liquid crystal display apparatus claimed in claim 15 further comprising the step of:

common electrode voltage controlling for changing a level of common electrode voltage applied to a common electrode confronting with the pixel driving electrode of the pixel element to be within two different levels so as to make an absolute value of potential difference across the liquid crystal layer to be approximately the same value in synchronism with timing of switching the positive and negative image signal voltages to be applied to the pixel driving electrode;

wherein the sampling processes in the step of first sampling and the step of second sampling are sequentially conducted after the level of the common electrode voltage is changed through the process in the step of common electrode voltage controlling.

18. The driving method of a liquid crystal display apparatus claimed in claim 17 further comprising the step of:

timing controlling for controlling a switching period of the positive and negative image signal voltages in the step of applying pixel driving electrode voltage and a level changing period of the common electrode voltage in the step of common electrode voltage controlling to be N-times a horizontal scanning period that is a selection period of the plurality of gate lines, where N is an arbitrary natural number, and for controlling reference timing of starting vertical scanning to be operated in a prescribed phase relation at each frame.

19. The driving method of a liquid crystal display apparatus claimed in claim 18, wherein the step of timing controlling controls mutual timing of switching the step of applying pixel driving electrode voltage and the step of common electrode voltage controlling to make polarity of the level changing period of the common electrode voltage and polarity of the switching period of the pixel driving electrode voltage to be reversed at each scanning frame during a period of writing the image signal into each pixel in a continuing plurality of lines within a same polarity period in a polarity reversing control period.

* * * * *